United States Patent
Uchida

(10) Patent No.: US 9,369,002 B2
(45) Date of Patent: Jun. 14, 2016

(54) POWER TRANSMITTING DEVICE, POWER RECEIVING DEVICE, AND NON-CONTACT CHARGING METHOD

(71) Applicant: FUJITSU LIMITED, Kawasaki-shi, Kanagawa (JP)

(72) Inventor: Akiyoshi Uchida, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 14/197,668

(22) Filed: Mar. 5, 2014

(65) Prior Publication Data

US 2014/0184147 A1  Jul. 3, 2014

Related U.S. Application Data

(63) Continuation of application No. PCT/JP2012/072995, filed on Sep. 7, 2012.

(30) Foreign Application Priority Data

Sep. 8, 2011  (JP) .............................. JP2011/070532

(51) Int. Cl.
| | |
|---|---|
| *H01M 10/44* | (2006.01) |
| *H01M 10/46* | (2006.01) |
| *H02J 7/02* | (2016.01) |
| *H02J 5/00* | (2016.01) |

(52) U.S. Cl.
CPC ......... *H02J 7/025* (2013.01); *H02J 5/005* (2013.01)

(58) Field of Classification Search
CPC ........... H02J 7/025; H02J 5/005; H02J 17/00; H01F 38/14

USPC ................. 320/107, 108, 116; 307/11, 104
See application file for complete search history.

(56) References Cited

U.S. PATENT DOCUMENTS

| | | | | |
|---|---|---|---|---|
| 8,692,410 | B2 * | 4/2014 | Schatz | ............... H01Q 1/248 307/104 |
| 8,723,366 | B2 * | 5/2014 | Fiorello | ............... H01F 38/14 307/104 |
| 8,729,737 | B2 * | 5/2014 | Schatz | ............... H03H 7/40 307/104 |
| 2010/0052431 | A1 | 3/2010 | Mita | |

(Continued)

FOREIGN PATENT DOCUMENTS

| | | |
|---|---|---|
| EP | 2833515 A1 | 2/2015 |
| JP | 2005-229150 | 8/2005 |

(Continued)

OTHER PUBLICATIONS

International Search Report corresponding to PCT/JP2012/072995 mailed on Nov. 20, 2012.

(Continued)

*Primary Examiner* — Edward Tso
(74) *Attorney, Agent, or Firm* — Fujitsu Patent Center

(57) ABSTRACT

In a non-contact charging method, variable information with which a resonance frequency of a resonance circuit of an equipment device having maximum charging power as the power transmitting frequency, and a resonance frequency or a Q value of a resonance circuit of a power receiving unit of an equipment device other than the equipment device having the maximum charging power as a resonance frequency or a Q value for charging depending on each charging power, and transmits to each equipment device variable information corresponding to each equipment device.

22 Claims, 45 Drawing Sheets

(56) References Cited

U.S. PATENT DOCUMENTS

| | | |
|---|---|---|
| 2010/0244580 A1 | 9/2010 | Uchida et al. |
| 2010/0253281 A1 | 10/2010 | Li |
| 2011/0193417 A1 | 8/2011 | Hirasaka et al. |
| 2012/0001485 A1 | 1/2012 | Uchida |
| 2012/0200158 A1 | 8/2012 | Takei |

FOREIGN PATENT DOCUMENTS

| | | |
|---|---|---|
| JP | 2009-253997 | 10/2009 |
| JP | 2010-51137 A | 3/2010 |
| JP | 2010-63245 A | 3/2010 |
| JP | 2010-268610 | 11/2010 |
| WO | 2010/036980 A1 | 4/2010 |
| WO | 2010/118161 | 10/2010 |
| WO | 2010116441 A1 | 10/2010 |
| WO | 2011/042974 | 4/2011 |

OTHER PUBLICATIONS

Notification of Transmittal of Copies of Translation of The International Preliminary Report on Patentability (Form PCT/IB/338, Form PCT/IB/373 & Form PCT/ISA/237), PCT/JP2012/072995, 9 pages, dated Mar. 20, 2014.

International Search Report (PCT/ISA/210) corresponding to International Application No. PCT/JP2011/070532 (priority application of PCT/JP2012/072995), dated Dec. 13, 2011, 2 pages, with English translation.

Notification of Transmittal of Copies of Translation of The International Preliminary Report on Patentability (Form PCT/IB/338, Form PCT/ISA/237), PCT/JP2011/070532, 5 pages, Mar. 20, 2014.

EESR—Extended European Search Report dated Apr. 29, 2015 for corresponding European patent application No. 12830491.2.

US2010/052431A1 cited in the above listed EESR was previously submitted in the IDS filed on Apr. 15, 2014. .

* cited by examiner

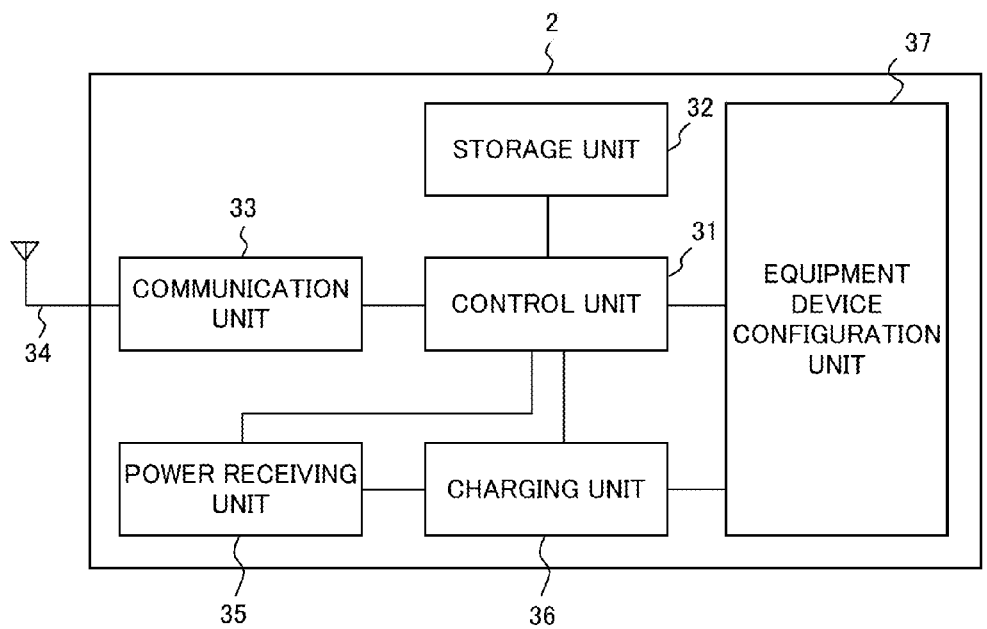
F I G. 3

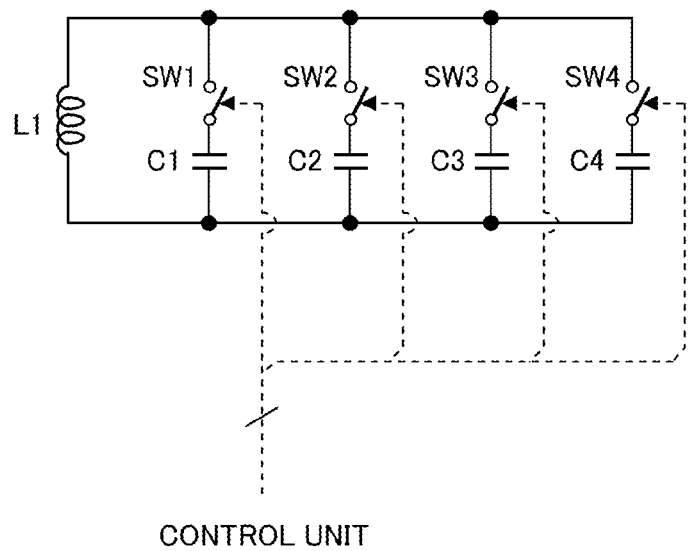
F I G. 4 A

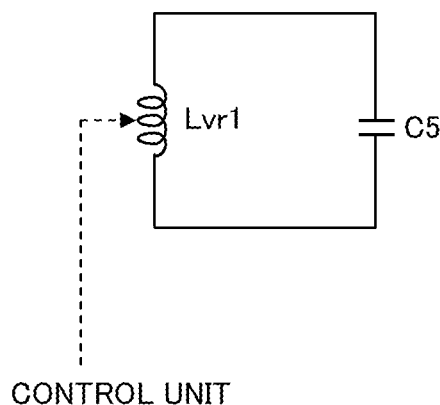
F I G. 4 B

CONTROL UNIT

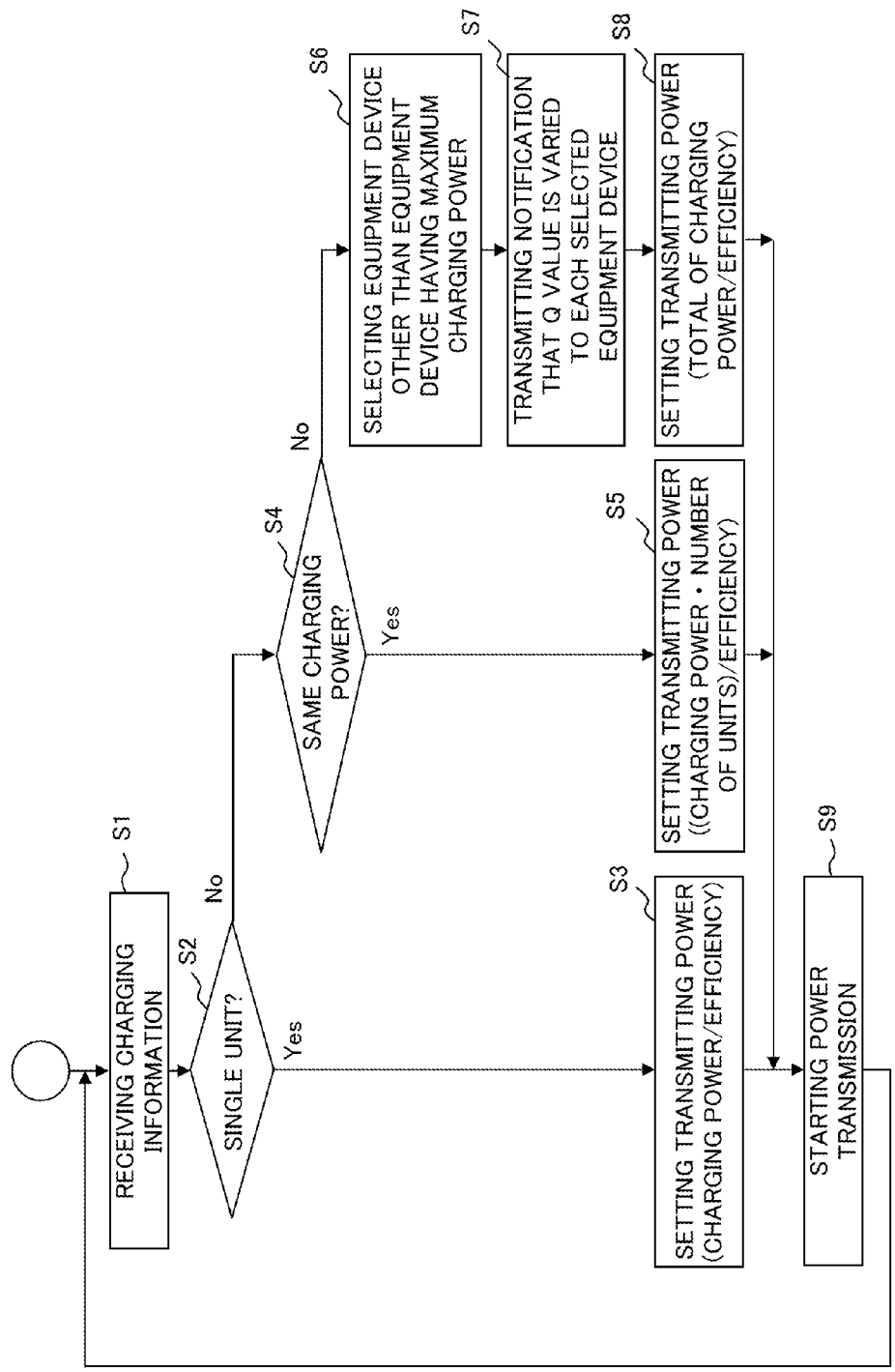
F I G. 6

71a

| ID | CHARGING POWER |
|----|----------------|
| A  | 50             |

F I G. 7 A

| ID | CHARGING POWER |
|----|----------------|
| B  | 5              |

71b

F I G. 7 B

| ID | CHARGING POWER |
|---|---|
| C | 3 |

| ID | POWER RECEPTION |
|----|-----------------|
| A  | 50              |
| B  | 5               |
| C  | 3               |

| ID | EFFICIENCY |
|----|------------|
| A | 0.8 |
| B | 0.8 |
| C | 0.8 |
| D | 0.8 |
| E | 0.8 |
| F | 0.9 |
| G | 0.9 |
| H | 0.85 |
| ⋮ | ⋮ |

| COMBINATION OF EQUIPMENT DEVICES | | | VARIABLE INFORMATION | | | EFFICIENCY INFORMATION | | |
|---|---|---|---|---|---|---|---|---|
| | | | A | B | C | A | B | C |
| A | B | | CA | CB1 | | EA1 | EB1 | |
| A | C | | CA | | CC1 | EA2 | | EC1 |
| B | C | | | CB | CC2 | | EB2 | EC2 |
| A | A | B | CA | CB2 | | EA3 | EB3 | |
| A | A | C | CA | | CC3 | EA4 | | EC3 |
| A | B | B | CA | CB3 | | EA5 | EB4 | |
| A | B | C | CA | CB4 | CC4 | EA6 | EB5 | EC4 |
| A | C | C | CA | | CC5 | EA7 | | EC5 |
| B | B | C | | CB | CC6 | | EB6 | EC6 |
| ⋮ | ⋮ | ⋮ | ⋮ | ⋮ | ⋮ | ⋮ | ⋮ | ⋮ |

81

F I G. 8

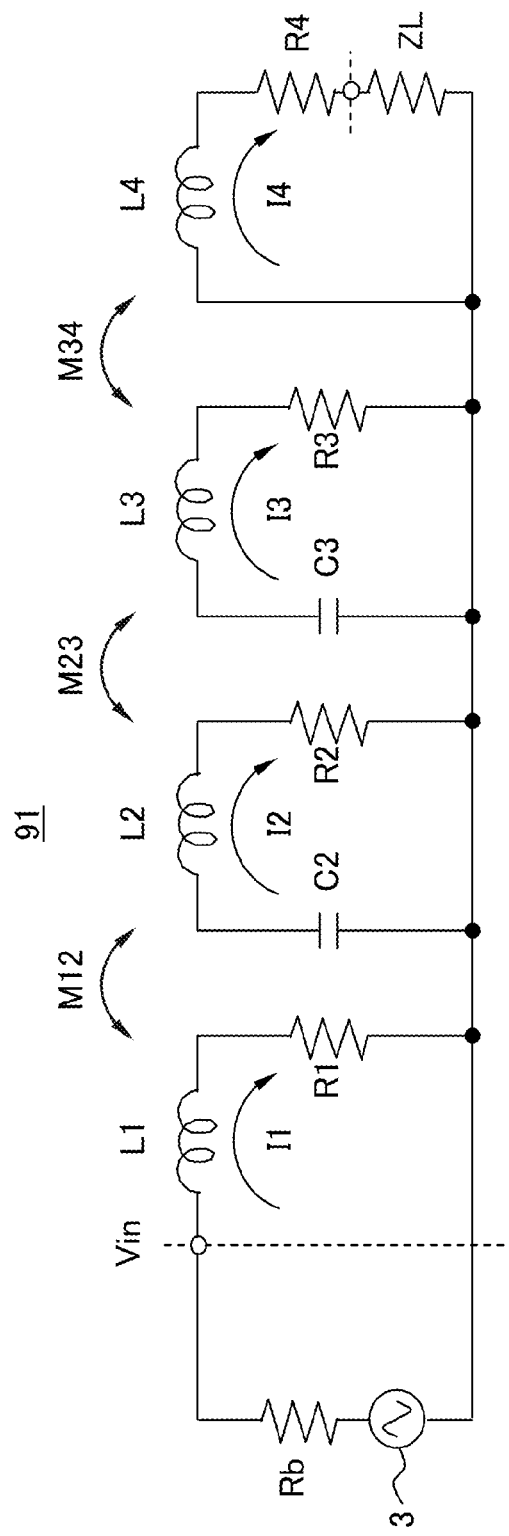
F I G. 9 A

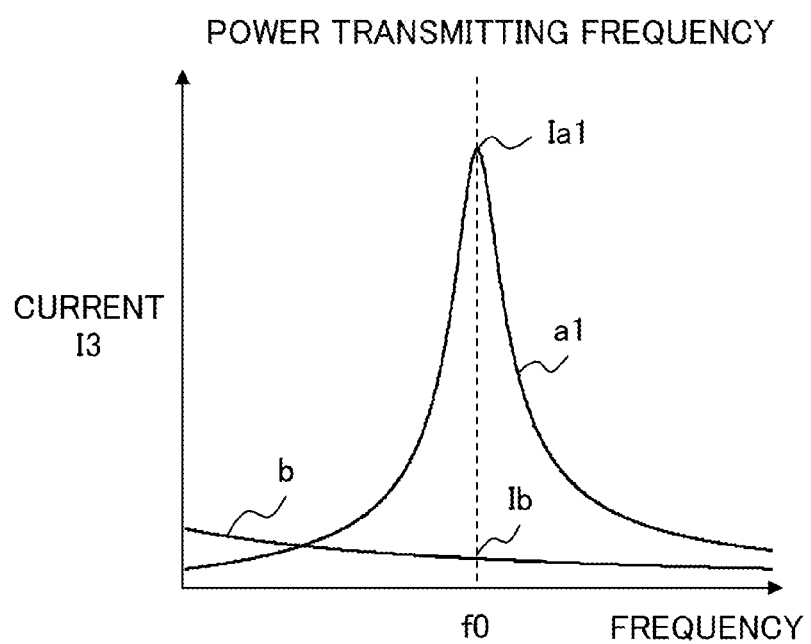
F I G. 1 2 A

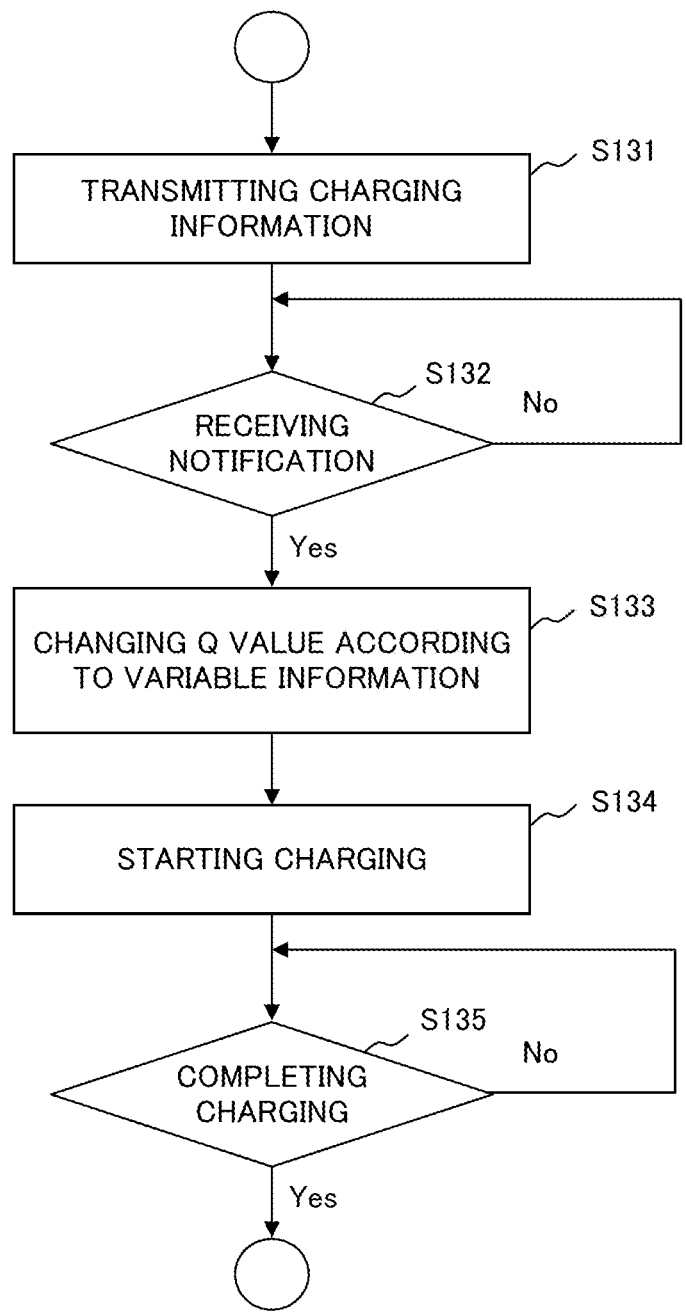
F I G. 13

| VARIABLE INFORMATION | SET VALUE |
|---|---|
| CA | dataA0 |
| CA1 | dataA1 |
| CA2 | dataA2 |
| CA3 | dataA3 |
| CA4 | dataA4 |
| CA5 | dataA5 |
| CA6 | dataA6 |
| CA7 | dataA7 |
| CA8 | dataA8 |
| ⋮ | ⋮ |

141

F I G. 1 4 A

| VARIABLE INFORMATION | SET VALUE |
|---|---|
| CB | dataB0 |
| CB1 | dataB1 |
| CB2 | dataB2 |
| CB3 | dataB3 |
| CB4 | dataB4 |
| CB5 | dataB5 |
| CB6 | dataB6 |
| CB7 | dataB7 |
| CB8 | dataB8 |
| ⋮ | ⋮ |

142

F I G. 1 4 B

143

| VARIABLE INFORMATION | SET VALUE |
|---|---|
| CC | dataC0 |
| CC1 | dataC1 |
| CC2 | dataC2 |
| CC3 | dataC3 |
| CC4 | dataC4 |
| CC5 | dataC5 |
| CC6 | dataC6 |
| CC7 | dataC7 |
| CC8 | dataC8 |
| ⋮ | ⋮ |

FIG. 14C

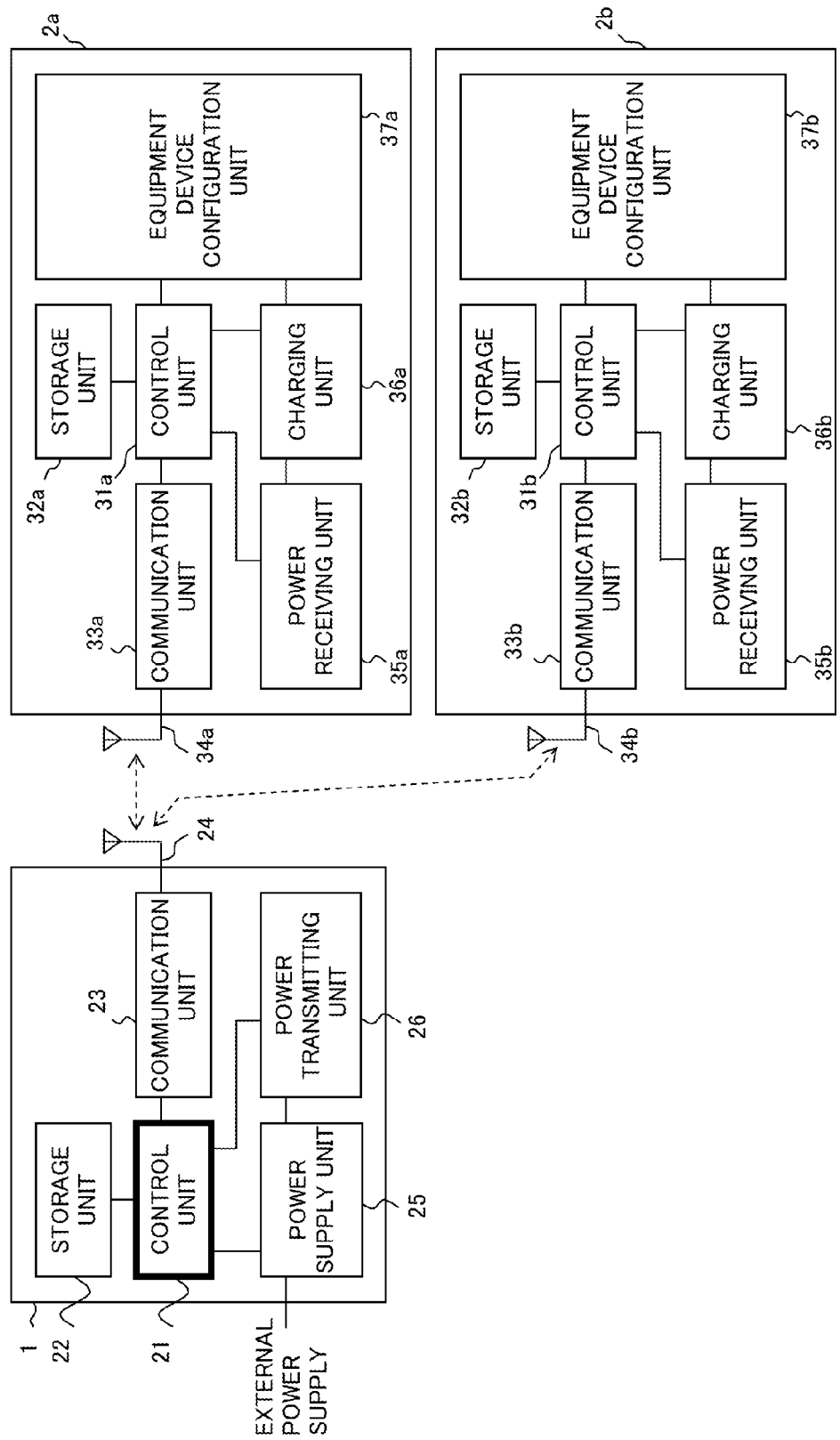

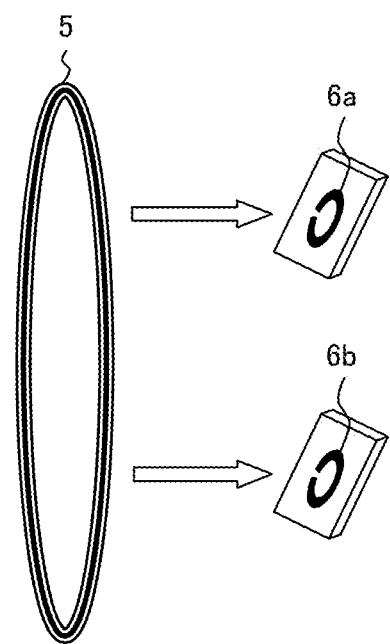
F I G. 2 6 A

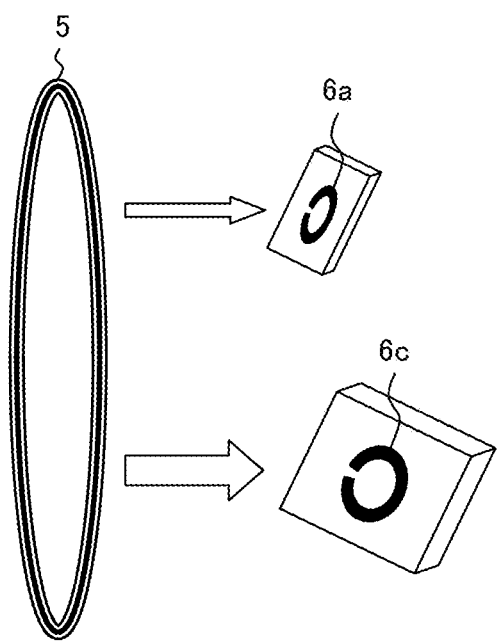
F I G. 27A

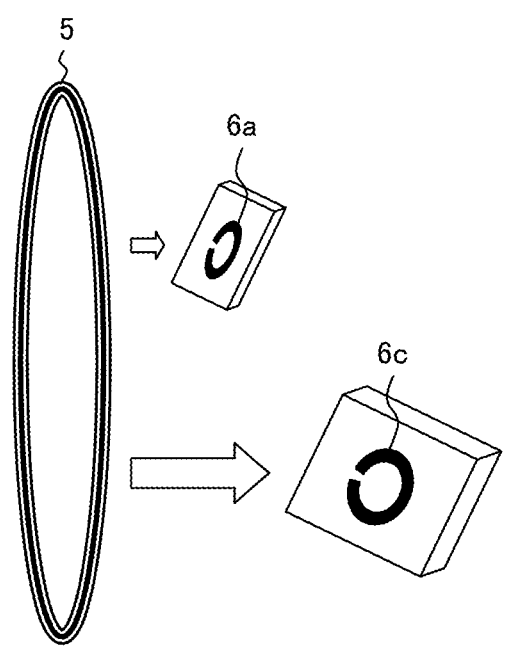
F I G. 27B

| ID | STATE INFORMATION | | | EFFICIENCY INFORMATION |
| --- | --- | --- | --- | --- |
| | POSITION INFORMATION | POSTURE INFORMATION | ... | |
| A | LA1 | RA1 | ... | EA11 |
| | | RA2 | ... | EA12 |
| | | ⋮ | ⋮ | ⋮ |
| | LA2 | RA1 | ... | EA21 |
| | | RA2 | ... | EA22 |
| | | ⋮ | ⋮ | ⋮ |
| | ⋮ | ⋮ | ⋮ | ⋮ |
| B | LAB1 | RB1 | ... | EB11 |
| | | RB2 | ... | EB12 |
| | | ⋮ | ⋮ | ⋮ |
| | LB2 | RB1 | ... | EB21 |
| | | RB2 | ... | EB22 |
| | | ⋮ | ⋮ | ⋮ |
| ⋮ | ⋮ | ⋮ | ⋮ | ⋮ |

| COMBINATION | | | VARIABLE INFORMATION | | | | | |
|---|---|---|---|---|---|---|---|---|
| | | | A1 | A2 | B1 | B2 | C1 | C2 |
| EA11 | | | CA11 | | | | | |
| | EA11 | | CA11 | CA11 | | | | |
| | EA12 | | CA11 | CA12 | | | | |
| | ⋮ | ⋮ | ⋮ | ⋮ | ⋮ | ⋮ | ⋮ | ⋮ |
| | EB11 | | CA11 | | CB11 | | | |
| | EB12 | | CA11 | | CB12 | | | |
| | ⋮ | ⋮ | ⋮ | ⋮ | ⋮ | ⋮ | ⋮ | ⋮ |
| EA12 | | | CA12 | | | | | |
| | EA12 | | CA12 | CA12 | | | | |
| | EA13 | | CA12 | CA12 | | | | |
| | ⋮ | ⋮ | ⋮ | ⋮ | ⋮ | ⋮ | ⋮ | ⋮ |
| | EB11 | | CA12 | | CB11 | | | |
| | EB12 | | CA12 | | CB12 | | | |
| | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |

3001

F I G. 3 0

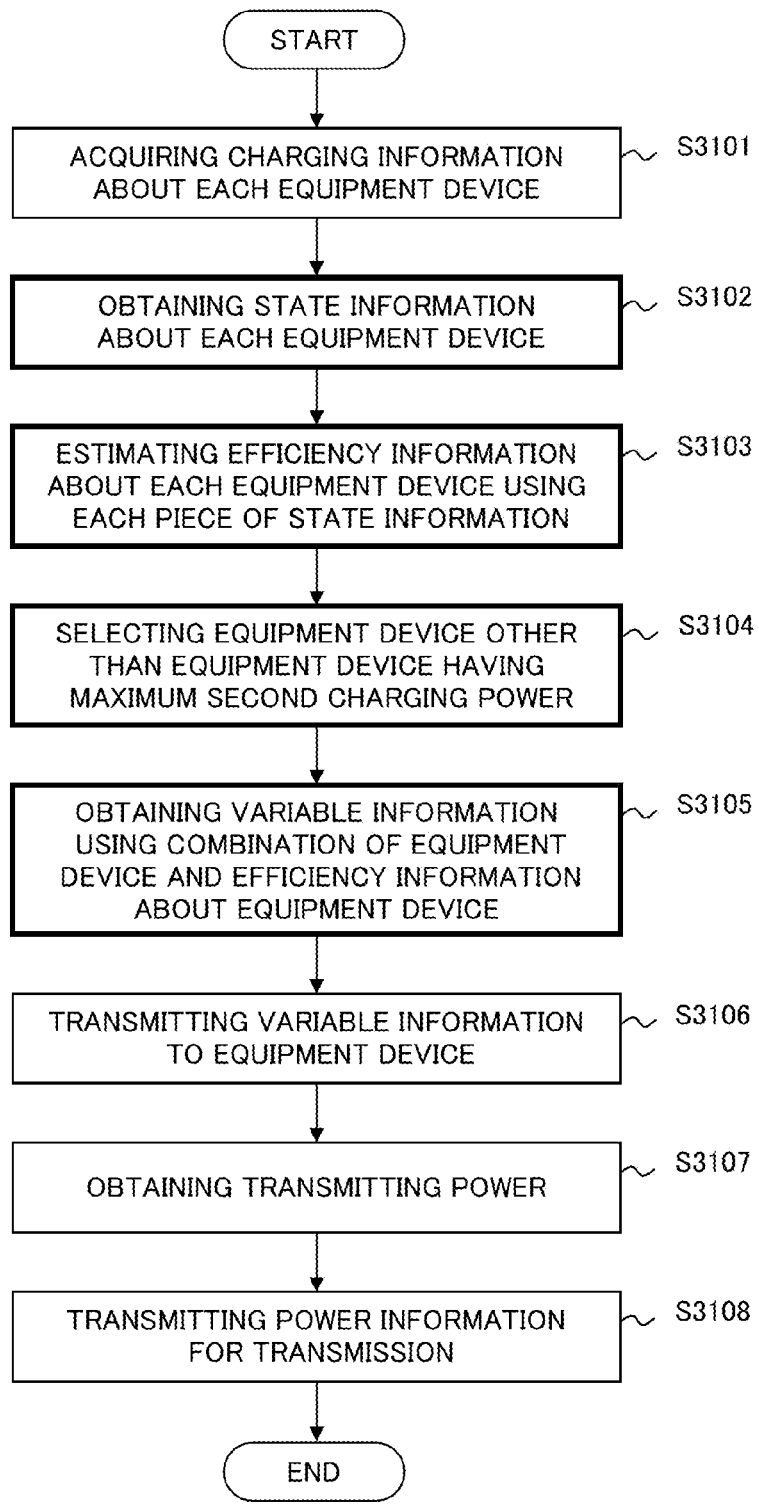
F I G. 31

POWER TRANSMITTING DEVICE, POWER RECEIVING DEVICE, AND NON-CONTACT CHARGING METHOD

CROSS-REFERENCE TO RELATED APPLICATION

This application is a continuation application of International Application PCT/JP2012/072995 filed on Sep. 7, 2012, which designated the United States, and which claims the benefit of priority to PCT/JP2011/070532 filed on Sep. 8, 2011. The entire contents of each of the above-identified International Applications are incorporated herein by reference.

FIELD

The present invention is related to a power transmitting device, a power receiving device for non-contact charging, and a non-contact charging method.

BACKGROUND

Recently, a non-contact charging method in which magnetic field resonance and electric field resonance are used has attracted a lot of attention as a non-contact charging method for a strongly coupled system using resonance. For example, the method is expected to be utilized for charging an electric device etc. However, since a power transmitting device transmits specified electric power in the conventional non-contact charging method, such a equipment device is unable to supply necessary charging power simultaneously to equipment devices having respective power receiving devices, each of which requires different power (charging power). This is, because the distribution ratio of the charging power to each of the equipment devices is determined depending on the coupling state of transmitting and receiving devices, and does not always match necessary electric power. That is, in the case in which a power transmitting device and a power receiving device are the same coupling state (for example, the equipment devices are equally located in distance), the power (transmitting power) transmitted from the power transmitting device is equally supplied to a plurality of equipment devices. Therefore, when the equally supplied electric power is larger than the charging power of the equipment devices, overcharge is incurred. Furthermore, when the equally supplied electric power is smaller than the charging power of the equipment devices, undercharge is incurred. Therefore, the equipment devices which expect a plurality of different values of charging power are not simultaneously charged.

For example, disclosed as a related technology is a charging system which simultaneously and equally charges a plurality of sensing devices. The charging system includes: a plurality of sensing devices which receive electromagnetic waves and charge the electric power obtained from the energy of the electromagnetic waves; a housing unit which stores a liquid in a concave portion; a radio wave emission unit which emits electromagnetic waves in the concave portion, and a stirring unit which stirs in the concave portion the liquid stored in the concave portion. Each sensing device charges the electric power obtained by receiving electromagnetic waves mixed in the liquid stored in the concave portion, moving in the concave portion depending on the stirring operation of the stirring unit, and emitted from the radio wave emission unit.

Also disclosed as a related technology is a positioning device for a searching system which may serve for a long period by providing a charging circuit which charges a battery by receiving electromagnetic waves, obtaining electric power which may be transmitted far. The positioning device for a searching system includes: an antenna which receives electromagnetic waves; a charging circuit which charge a battery with the electric energy of the received electromagnetic waves; a receiver which receives a call signal; a transmitter which is driven by a battery; and a storage device. The storage device stores owner identification information for identification of the owner of an equipment device. The receiver receives a call signal including the owner identification information, activates the transmitter when the battery is charged, and transmits to the transmitter a signal including the owner identification information stored in the storage device. For example, refer to the patent documents 1 and 2.

Patent Document 1: Japanese Laid-open Patent Publication No. 2009-253997
Patent Document 2: Japanese Laid-open Patent Publication No. 2005-229150

SUMMARY

A power transmitting device according to an aspect of an embodiment includes a power transmitting unit, a control unit, a power supply unit, and a communication unit.

The power transmitting unit transmits electric power at a power transmitting frequency using magnetic field resonance or electric field resonance to each of a plurality of equipment devices having a non-contact power receiving unit.

The control unit obtains variable information which sets the resonance frequency of the resonance circuit of an equipment device having the maximum charging power as a power transmitting frequency, and sets the resonance frequency or the Q value of the resonance circuit of the power receiving unit of an equipment device other than the equipment device having the maximum charging power as the resonance frequency or the Q value which may be charged depending on each charging power. The power supply unit provides the power transmitting unit with the electric power to be transmitted to an equipment device. The communication unit transmits to each equipment device the variable information corresponding to each equipment device.

The power receiving device according to another aspect of the present invention includes a power receiving unit and a control unit.

The power receiving unit receives electric power from the power transmitting device having a non-contact power transmitting unit using magnetic field resonance or electric field resonance.

The control unit generates charging information to be transmitted to the power transmitting device from an equipment device having identification information for identification of the equipment device and information about charging power associated with the equipment device. The control unit also receives from the power transmitting device the variable information for varying the resonance frequency or the Q value of the resonance circuit of the power receiving unit of the unit. Furthermore, the control unit varies the resonance frequency of the resonance circuit of the power receiving unit as a power transmitting frequency for the equipment device having the maximum charging power. For the equipment device other than the equipment device having the maximum charging power, the control unit varies the resonance frequency or the Q value of the resonance circuit of the power receiving unit to the frequency at which the charging power corresponding to the equipment device other than the equipment device having the maximum charging power may be provided from the transmitting power transmitted from the power transmitting device.

Furthermore, the power receiving device includes a communication unit for communicating with the power transmitting device and the equipment device. Then, the communication unit obtains variable information which sets the resonance frequency of the resonance circuit of an external device having the maximum charging power as a power transmitting frequency, and sets the resonance frequency or the Q value of the resonance circuit of the power receiving unit of an equipment device other than the equipment device having the maximum charging power as the resonance frequency or the Q value which may be charged depending on each charging power. Furthermore, the control unit instructs each equipment device to transmit through the communication unit the variable information corresponding to each equipment device.

An external device according to another aspect of the present invention includes a communication unit and a control unit.

The communication unit communicates with a power transmitting device and an external device.

The control unit obtains variable information which sets the resonance frequency of the resonance circuit of an external device having the maximum charging power as a power transmitting frequency, and sets the resonance frequency or the Q value of the resonance circuit of the power receiving unit of an equipment device other than the equipment device having the maximum charging power as the resonance frequency or the Q value which may be charged depending on each charging power. Furthermore, the control unit transmits to each equipment device through the control unit the variable information corresponding to each equipment device. Furthermore, the control unit instructs the power transmitting device through the communication unit the charging power corresponding to each external device and efficiency information, or the electric power to be transmitted which has been obtained using the charging power and the efficiency information.

According to an embodiment of the present invention, acquired is an effect of simultaneously charging a plurality of power receiving devices different in charging power.

The object and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIG. 3 illustrates an embodiment of hardware of an equipment device provided with a power receiving device;

FIGS. 4A and 4B illustrate an embodiment of a resonance circuit;

FIG. 6 is a flowchart of an embodiment of an operation of a power transmitting device;

FIGS. 7A, 7B, 7C, 7D and 7E illustrate an embodiment of the data structure of charging information, power reception information, and efficiency information;

FIG. 8 illustrates an embodiment of the data structure of combination information;

FIGS. 9A and 9B illustrate an embodiment of an equivalence circuit of a non-contact charging system of magnetic field resonance and electric field resonance;

FIGS. 12A and 12B are an example of the relationship between a power transmitting frequency and a Q value of a power receiving unit;

FIG. 13 is a flowchart of an embodiment of an operation of an equipment device;

FIGS. 14A, 14B and 14C illustrate an embodiment of the data structure of Q value variable information;

FIG. 15 illustrates an embodiment of a system having a power transmitting device and a power receiving device according to the first embodiment;

FIGS. 26A, 26B and 26C illustrate the positional relationship between a power transmission resonance coil and a power reception resonance coil;

FIGS. 27A, 27B and 27C illustrate the positional relationship between a power transmission resonance coil and a power reception resonance coil;

FIG. 29 illustrates an embodiment of the data structure of state-efficiency information;

FIG. 30 illustrates an embodiment of the data structure of combination information according to the fourth embodiment;

FIG. 31 a flowchart of an embodiment of an operation of a primary control unit according to the fourth embodiment.

DESCRIPTION OF EMBODIMENTS

An embodiment of the present invention is described below in detail with reference to the attached drawings.

The first embodiment is described as follows.

Figure 1:
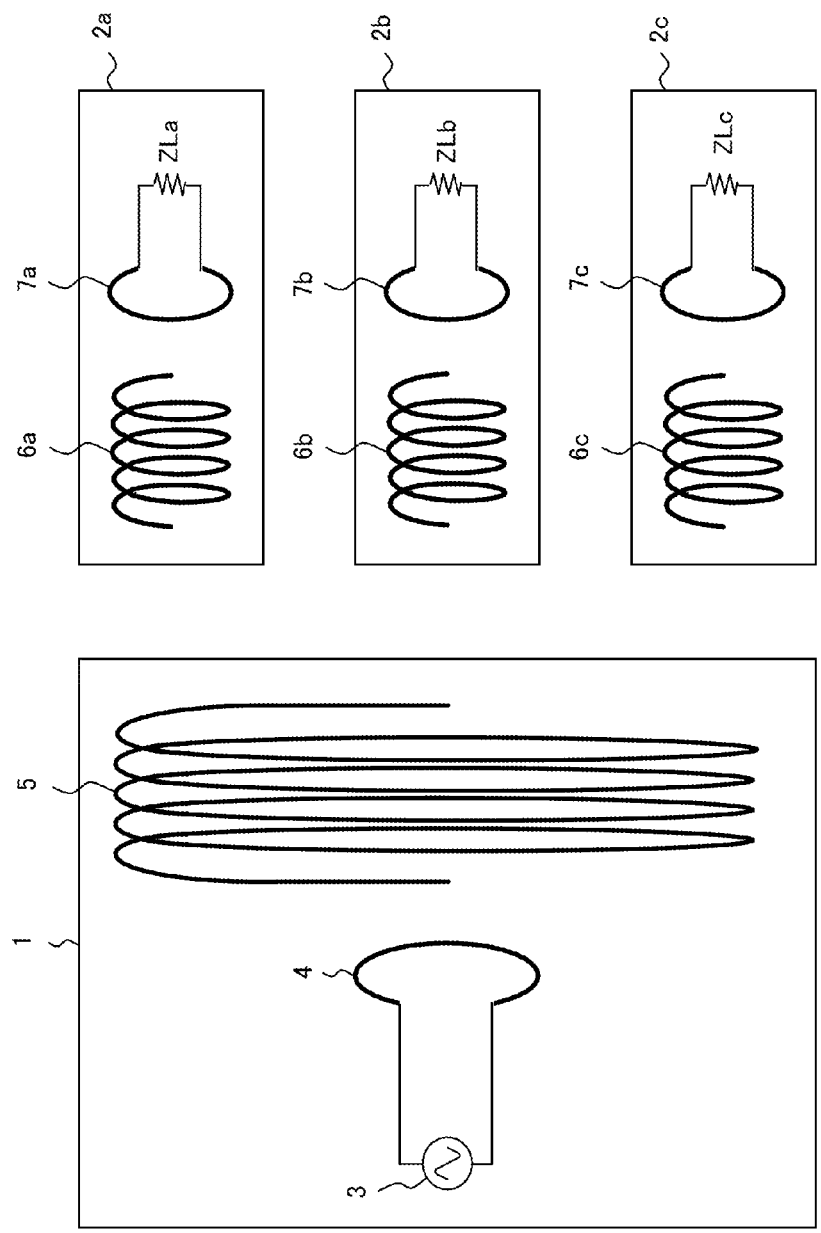
FIG. 1 illustrates an embodiment of a system having a strongly coupled non-contact power transmitting device and an equipment device provided with a power receiving device.

FIG. 1 illustrates an embodiment of a system having a strongly coupled non-contact power transmitting device and an equipment device provided with a power receiving device. The system having a power transmitting device 1 illustrated in FIG. 1 and a plurality of equipment devices 2a, 2b, and 2c provided with a power receiving device is a system for supplying electric power to each of the equipment devices 2a, 2b, and 2c from the power transmitting device 1 using magnetic field resonance or electric field resonance. Furthermore, although the equipment devices 2a, 2b, and 2c have different charging power (or receiving power) in the system illustrated in FIG. 1, the charging operation may be simultaneously performed by adjusting the balance of the receiving power in the equipment devices 2a, 2b, and 2c.

The power transmitting device 1 illustrated in FIG. 1 includes a power source unit 3, a power supply coil 4, and a power transmission resonance coil 5. The equipment devices 2a, 2b, and 2c respectively include power reception resonance coils 6a, 6b, and 6c, power take-up coils 7a, 7b, and 7c, and loads ZLa, ZLb, and ZLc. The power transmitting device 1 and the equipment devices 2a, 2b, and 2c are described later in detail.

Relating to the power transmitting device 1 and the equipment devices 2a, 2b, and 2c provided with a power receiving device, described below is the case in which electric power is transmitted and received using the power supply coil 4, the power transmission resonance coil 5, the power reception resonance coils 6a, 6b, and 6c, and the power take-up coils 7a, 7b, and 7c. The power source unit 3 of the power transmitting device 1 supplies electric power to the power transmission resonance coil 5 through the power supply coil 4. The power source unit 3 is provided with, for example, an oscillation circuit, supplies the power supply coil 4 with the electric power provided from an external power supply not illustrated in the attached drawings at the resonance frequency at which resonance is generated between the power transmission resonance coil 5 and the power reception resonance coils 6a, 6b, and 6c.

The power supply coil 4 may be a circuit which supplies the electric power provided from the power source unit 3 to the power transmission resonance coil 5 by electromagnetic induction. The power supply coil 4 and the power transmission resonance coil 5 are arranged at the positions in which electric power may be supplied by electromagnetic induction.

The power transmission resonance coil 5 may be, for example, a circuit having a helical coil. In addition to the helical coil, it may be a circuit as a combination of a spiral coil and a condenser. The power transmission resonance coil 5 may be expressed by an LC resonance circuit, and the resonance frequency (power transmitting frequency f0) of the power transmission resonance coil 5 may be expressed by the equation 1.

$$f0 = 1/2\pi\sqrt{LC} \qquad \text{equation 1}$$

f0: resonance frequency of power transmission resonance coil
L: inductance of power transmission resonance coil
C: capacitance of power transmission resonance coil
√LC: 1/2-th power of (LC)

The power reception resonance coils 6a, 6b, and 6c may be circuits having a coil whose inductance is variable, or a condenser whose capacitance is variable. The resonance frequency of each of the power reception resonance coils 6a, 6b, and 6c is variable. In addition, each of the power reception resonance coils 6a, 6b, and 6c may be expressed by an LC resonance circuit, and the resonance frequency f1 of the power reception resonance coil may be expressed by the equation 2 below.

$$f1 = 1/2\pi\sqrt{Lvr \cdot Cvr} \qquad \text{equation 2}$$

f1: resonance frequency of power reception resonance coil
Lvr: inductance of power reception resonance coil
Cvr: capacitance of power reception resonance coil
√LC: 1/2-th power of (Lvr·Cvr)

Each of the power take-up coils 7a, 7b, and 7c may be a circuit which takes out electric power by electromagnetic induction from each of the power reception resonance coils 6a, 6b, and 6c. The power take-up coils 7a, 7b, and 7c corresponding to the power reception resonance coils 6a, 6b, and 6c are arranged at the positions in which electric power may be supplied by electromagnetic induction.

The loads ZLa, ZLb, and ZLc are respectively connected to the power take-up coils 7a, 7b, and 7c. Each of the loads ZLa, ZLb, and ZLc is, for example, a battery, an electronic equipment device, etc. Practically, at the stage before the loads ZLa, ZLb, and ZLc, a rectifying circuit for converting an AC into a DC, an AC-DC converter, etc. are connected. Furthermore, a voltage converter for converting a voltage into a specified voltage value, a transformer, a detection circuit for monitoring the amount of charge, etc. may be connected.

Described below is the variable resonance frequency of the power reception resonance coils 6a, 6b, and 6c.

When there is one equipment device which is charged by the power transmitting device 1, for example, when there is only the equipment device 2a in FIG. 1, the power transmitting frequency f0 of the transmitting power to be transmitted from the power transmitting device 1 is made to be equal to the resonance frequency f1 of the power reception resonance coil (LC resonance circuit) of the power receiving device which receives the transmitting power of the equipment device 2a. Then, the power transmitting device 1 transmits the electric power which may be supplied to the equipment device 2a When a plurality of equipment devices to be charged by the power transmitting device 1 require the same charging power, for example, the equipment devices 2a, 2b, and 2c require the same charging power, the resonance frequency f1 of the resonance circuit of the power receiving device of each of the equipment devices 2a, 2b, and 2c is made to be equal to the power transmitting frequency f0. Then, the power transmitting device 1 transmits the electric power which may be supplied to the equipment devices 2a, 2b, and 2c. Furthermore, if a plurality of equipment devices require the same charging power, the power transmitting device 1 transmits the electric power which may be supplied to all equipment devices. In the present embodiment, the power transmitting device power transmitting device 1 transmits electric power for three equipment devices, that is, the equipment devices 2a, 2b, and 2c.

Described next is the case in which the plurality of equipment devices to be charged by the power transmitting device 1 require different charging power, for example, the equipment devices 2a, 2b, and 2c require different charging power. The resonance frequency f1 of the equipment device having the maximum charging power in the equipment devices 2a, 2b, and 2c is made equal to the power transmitting frequency f0. The resonance frequency of the equipment device other than the equipment device having the maximum charging power is set equal to the resonance frequency determined depending on the electric power required to charge each equipment device, and the balance between the transmission and the reception of electric power is adjusted. Afterwards, the power transmitting device 1 transmits electric power to each equipment device. When a plurality of equipment devices require different charging power, the power transmitting device 1 transmits electric power required to charge each equipment device. In the present embodiment, the electric power transmitted by the power transmitting device 1 is a total of the charging power for the equipment devices 2a, 2b, and 2c.

Since it is hard to realize in a practical circuit to completely match the power transmitting frequency f0 with the resonance frequency f1, it is assumed that the resonance frequency f1 is equal to the power transmitting frequency f0 if they are in a specified frequency range.

The power transmitting device 1 is described below with reference to FIG. 2.

Figure 2:
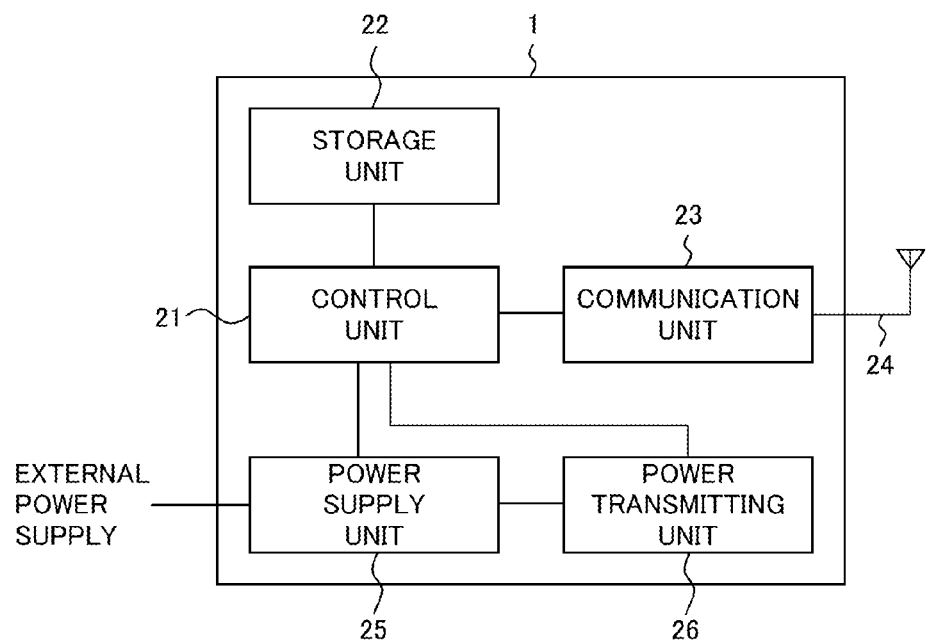
FIG. 2 illustrates an embodiment of hardware of a power transmitting device.

FIG. 2 illustrates an embodiment of hardware of a power transmitting device. The power transmitting device 1 illustrated in FIG. 2 includes a control unit 21, a storage unit 22, a communication unit 23, an antenna 24, a power supply unit 25, and a power transmitting unit 26. The power transmitting device 1 may be, for example, a flat charging table etc. which is represented by a resonant charging pad. Furthermore, each of one or more equipment devices arranged for power charging on the power transmission resonance coil of the power transmitting unit 26 of the power transmitting device 1, and in a range enclosed by the power transmission resonance coil may receive substantially constant electric power through the power transmission resonance coil. It is because, in any position where the power reception resonance coil is placed on the power transmission resonance coil and in the range enclosed by the power transmission resonance coil, it is approximated that the relative position between the power transmission resonance coil and the power reception resonance coil of the equipment device remains unchanged.

The power transmitting device 1 may vary the electric power of the source within the maximum transmitting power.

The control unit 21 controls each unit of the power transmitting device 1. The control unit 21 also acquires from each equipment device the identification information for identification of the equipment devices 2a, 2b, and 2c, and the information about the charging power associated with the equipment devices 2a, 2b, and 2c. Using the acquired identification information, the control unit 21 varies the combination and the resonance frequency or the Q value of the resonance circuit of a power receiving unit 35 of each equipment device associated with the combination. The control unit 21 refers to the combination of one or more equipment devices and the combination information including variable information about each equipment device associated with the combination of one or more equipment devices, and selects the variable information associated with each equipment device. Using the variable information, the combination of one or more equipment devices, and the combination of one or more equipment devices and the resonance frequency or the Q value of the resonance circuit of the power receiving unit of each equipment device are varied, thereby setting the resonance frequency of the resonance circuit of the equipment device having the maximum charging power as a power transmitting frequency. Furthermore, using the variable information, the resonance frequency or the Q value of the resonance circuit of the power receiving unit of an equipment device other than the equipment device having the maximum charging power is varied to the resonance frequency or the Q value with which each charging power corresponding to each equipment device other than the equipment device having the maximum charging power may be charged. Then, the control unit 21 refers to each efficiency associated with the identification information according to acquired identification information, and obtains the transmitting power using the acquired charging power and efficiency corresponding to each equipment device.

Furthermore, the control unit 21 may use a central processing unit (CPU), a multi-core CPU, a programmable device (field programmable gate array (FPGA), programmable logic device (PLD), etc.).

The storage unit 22 stores the power reception information, the efficiency information, the combination information, etc. The storage unit 22 may be, for example, read only memory (ROM), random access memory (RAM), etc., a hard disk, etc. Furthermore, the storage unit 22 may store data such as a parameter value, a variable, etc., and may be used as a work area at run time.

The communication unit 23 is an interface which is connected to the antenna 24, and performs communications such as a wireless communication etc. with a communication unit 33 of the power receiving device. For example, it may be an interface for a wireless connection for a wireless local area network (LAN), Bluetooth (registered trademark), etc. The communication unit 23 transmits to the equipment device having the maximum charging power the variable information used in varying the resonance frequency of the resonance circuit of the power receiving unit to a power transmitting frequency. The communication unit 23 transmits to each equipment device other than the equipment device having the maximum charging power the variable information used in varying the resonance frequency of the resonance circuit of the power receiving unit to the resonance frequency or the Q value depending on each charging power corresponding to each equipment device other than the equipment device having the maximum charging power.

When the power supply unit 25 transmits electric power using the power supply coil 4 and the power transmission resonance coil 5 explained with reference to FIG. 1, the power supply unit 25 is provided with the power source unit 3 and the power supply coil 4.

When the power supply coil 4 is not used, the power source unit 3 directly supplies electric power to the power transmission resonance coil 5. The power source unit 3 includes, for example, a resonance circuit and a power transmission amplifier. The oscillation circuit generates a power transmitting frequency f0. The power transmission amplifier inputs the electric power supplied from an external power supply to the power transmission resonance coil 5 at a frequency generated by the oscillation circuit. Furthermore, the resonance frequency of the oscillation circuit may be varied, and the variable control may be performed by the control unit 21.

The power transmitting unit 26 includes the power transmission resonance coil 5 illustrated in FIG. 1. The resonance frequency of the coil L and the condenser C of the resonance circuit of the power transmitting unit 26 may be varied using a coil whose inductance may be varied or a condenser whose capacitor may be varied, and variable control may be performed by the control unit 21.

The equipment device provided with a power receiving device is explained with reference to FIG. 3.

FIG. 3 illustrates an embodiment of hardware of an equipment device provided with a power receiving device. The equipment device 2 includes a control unit 31, a storage unit 32, a communication unit 33, an antenna 34, a power receiving unit 35, a charging unit 36, and a equipment device configuration unit 37. The power receiving device may be, for example, the control unit 31, the storage unit 32, the communication unit 33, the antenna 34, the power receiving unit 35, and the charging unit 36.

The control unit 31 controls each unit of the equipment devices 2 (the equipment devices 2a, 2b, and 2c in FIG. 1). The control unit 31 generates charging information including the identification information for identification of an equipment device and the information about the charging power associated with an equipment device, and transmits the generated information from the equipment device to the power transmitting device 1. The control unit 31 receives from the power transmitting device 1 the variable information used in varying the resonance frequency or the Q value of the resonance circuit of the power receiving unit 35.

In the case of the equipment device having the maximum charging power, the resonance frequency of the resonance circuit of the power receiving unit 35 is varied to the power transmitting frequency. In the case of the equipment device other than the equipment device having the maximum charging power, the resonance frequency of the resonance circuit of the power receiving unit 35 is varied to the frequency at which the charging power corresponding to the equipment device other than the equipment device having the maximum charging power may be supplied from the transmitting power transmitted from the power transmitting device 1.

Furthermore, the control unit 31 may use a central processing unit (CPU), a multi-core CPU, a programmable device (field programmable gate array (FPGA), programmable logic device (PLD), etc.).

The storage unit 32 stores the charging information, the Q value variable information, etc. The storage unit 32 may be, for example, read only memory (ROM), random access memory (RAM), etc., a hard disk, etc. Furthermore, the storage unit 32 may store data such as a parameter value, a variable, etc., and may be used as a work area at run time.

The communication unit 33 is an interface which is connected to the antenna 34, and performs communications such as a wireless communication etc. with a communication unit 33 of the power transmitting device 1. For example, it may be an interface for a wireless connection for a wireless local area network (LAN), Bluetooth (registered trademark), etc.

Figure 5:
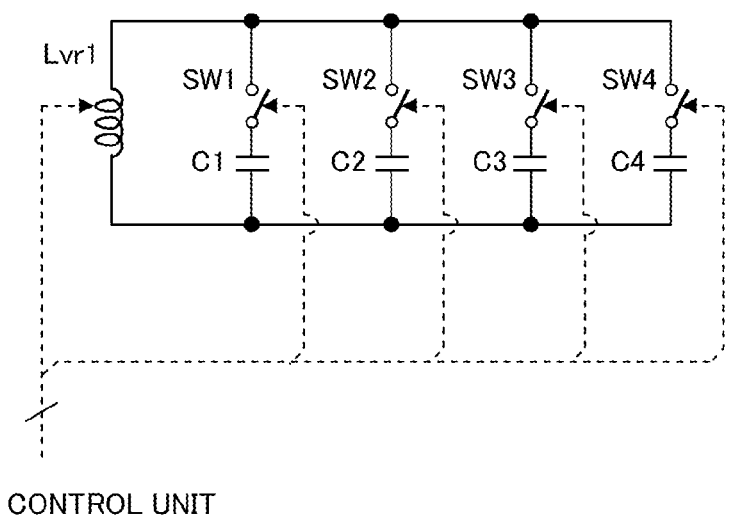
FIG. 5 illustrates an embodiment of a resonance circuit.

The power receiving unit 35 includes the power reception resonance coils 6a, 6b, and 6c illustrated in FIG. 1. FIGS. 4 and 5 illustrate the circuit of the power receiving unit 35. FIGS. 4 and 5 illustrate an embodiment of a resonance circuit.

In the circuit illustrated in FIGS. 4 and 5, the balance of the transfer of electric power is adjusted by varying the resonance frequency. That is, the resonance frequency is varied by varying the inductance or the capacitance of the LC resonance circuit of the power receiving unit 35, thereby adjusting the balance of the transfer of electric power. In addition, the resonance frequency of the LC resonance circuit of the equipment device having the maximum charging power is set equal to the power transmitting frequency, and the resonance frequency of the LC resonance circuit of the equipment device other than the equipment device having the maximum charging power is variable.

In the magnetic field resonance, it is preferable that the capacitance of a condenser is varied. Since a coil is used in the coupling for power transmission in the magnetic field resonance, a parameter for determination of the power transmission capacity such as a coupling coefficient is changed if the inductance of the coil which is optimized for the transmission of electric power is varied. Therefore, it is preferable that the capacitance of a condenser not used in the coupling of the transmission of electric power is varied.

An LC resonance circuit 41 used in the magnetic field resonance illustrated in FIG. 4A includes a coil L1, condensers C1, C2, C3, and C4, and switches SW1, SW2, SW3, and SW4, thereby varying the capacitance and adjusting the resonance frequency. The switch SW1 and the condenser C1 are connected in series, the switch SW2 and the condenser C2 are connected in series, the switch SW3 and the condenser C3 are connected in series, and the switch SW4 and the condenser C4 are connected in series. The four circuits connected in series as described above are connected to the coil L1 in parallel. The ON (closed) and OFF (open) states of the switches SW1, SW2, SW3, and SW4 are controlled by the control unit 31, thereby varying the capacitance.

A LC resonance circuit 42 illustrated in FIG. 4B includes a coil Lvr1 whose inductance may be varied and the condenser C5, and adjusts the resonance frequency by varying the inductance. The coil Lvr1 and the condenser C5 are connected in parallel, and the inductance of the coil Lvr1 is controlled by the control unit 31.

In the electric field resonance, a parameter for determination of the power transmission capacity such as a coupling coefficient is changed if the capacitance of the condenser C5 which is optimized for the transmission of electric power is varied. Therefore, it is preferable that the inductance of the coil provided on the power reception side which is not used in the coupling of the transmission of electric power is varied.

A LC resonance circuit 51 illustrated in FIG. 5 includes the coil Lvr1, the condensers C1, C2, C3, and C4, and the switches SW1, SW2, SW3, and SW4, and adjusts the resonance frequency by varying the inductance or the capacitance. If the switch SW1 and the condenser C1 are connected in series, the switch SW2 and the condenser C2 are connected in series, the switch SW3 and the condenser C3 are connected in series, and the switch SW4 and the condenser C4 are connected in series. Furthermore, the above-mentioned four circuits connected in series are connected parallel to the coil Lvr1. The ON (closed) and OFF (open) states of the switches SW1, SW2, SW3, and SW4 vary the capacitance by the control of the control unit 31. The inductance of the coil Lvr1 is controlled by the control unit 31.

The circuits represented by the LC resonance circuits 41, 42, and 51 are embodiments, and the numbers and the circuit configurations of the coils and the condensers are not limited, but a configuration in which the resonance frequency is varied is acceptable.

The charging unit 36 includes a power take-up coil, a rectifier circuit connected to the power take-up coil, and a battery. When electric power is received using the power reception resonance coil 6a and the power take-up coil 7a illustrated in FIG. 1, and the received electric power is charged, the charging unit 36 includes the power take-up coil 7a, the rectifier circuit connected to the power take-up coil 7a, and a battery. Similarly, when electric power is received using the power reception resonance coil 6b and the power take-up coil 7b illustrated in FIG. 1, and the received electric power is charged, the charging unit 36 includes the power take-up coil 7b, the rectifier circuit connected to the power take-up coil 7b, and a battery. When electric power is received using the power reception resonance coil 6c and the power take-up coil 7c, and the received electric power is charged, the charging unit 36 includes the power take-up coil 7c, the rectifier circuit connected to the power take-up coil 7c, and a battery.

Furthermore, when no power take-up coil is used, the charging unit 36 is directly connected to the power reception resonance coil of the power receiving unit 35. In the case of the power reception resonance coil 6a illustrated in FIG. 1, a rectifier circuit and a battery are connected to the power reception resonance coil 6a. In the case of the power reception resonance coil 6b, a rectifier circuit and a battery are connected to the power reception resonance coil 6b. In the case of the power reception resonance coil 6c, a rectifier circuit and a battery are connected to the power reception resonance coil 6c. Although a rectifier circuit is used as a circuit for charging the battery of the charging unit 36 in the present embodiment, the battery may be charged using another charging circuit.

The equipment device configuration unit 37 refers to the portion other than the power receiving device of an equipment device. When the equipment device is a mobile equipment device, the portion which realizes the function of a device other than the power receiving device of a mobile equipment device is the equipment device configuration unit 37.

The operation of the power transmitting device 1 is described below with reference to FIG. 6.

FIG. 6 is a flowchart of an embodiment of an operation of a power transmitting device. In step S1, the power transmitting device 1 receives a signal including the charging information transmitted from an equipment device using, for example, a wireless communication. The communication unit 23 forwards the charging information included in a received signal to the control unit 21. The charging information includes the identification information for identification of an equipment device and the information about the charging power of each equipment device. FIGS. 7A, 7B, 7C, 7D and 7E illustrate an embodiment of the data structure of charging information, power reception information, and efficiency information. Charging information 71a, 71b, and 71c illustrated in FIGS. 7A, 7B and 7C refer to the information stored in "ID" and "CHARGING POWER". The charging information 71a is transmitted from, for example, the equipment device 2a in FIG. 1, "A" is stored in "ID" as the identification information about the equipment device 2a, and "50" indicating 50 W is stored in "CHARGING POWER" as the charging power of the equipment device 2a. The charging information 71b is transmitted from, for example, the equipment device 2b, and "B" is stored in "ID" as the identification information about the equipment device 2b, and "5 is stored in "CHARGING POWER" indicating 5 W as the charging power of the equipment device 2b. The charging information 71c is transmitted from, for example, the equipment device 2c illustrated in FIG. 1, "C" is stored in "ID" as the identification information about the 2c, and "3" indicating 3 W is stored in "CHARGING POWER" as the charging power of the equipment device 2c.

Then, in step S1, the control unit 21 stores the charging information received from the equipment devices 2a, 2b, and 2c in the power reception information in the storage unit 22. The power reception information includes the identification information for identification of an equipment device, and the information about the charging power of each equipment device. Power reception information 72 illustrated in FIG. 7D includes the information stored in the "ID" and "CHARGING POWER". In this embodiment, the charging information 71a, 71b, and 71c received from the equipment devices 2a, 2b, and 2c are stored in the power reception information 72.

In step S1, after receiving the signal including the charging information from the equipment device, the control unit 21 confirms that the signal including the charging information is not transmitted from the equipment device for a specified period, and passes control to step S2. That is, the equipment device to be charged is determined. For example, when the equipment device 2a is arranged in the power transmitting device 1, the signal including the charging information 71a is transmitted from the equipment device 2a to the power transmitting device 1. If new charging information is not received when a specified period passes after the power transmitting device 1 has received the signal, control is passed to step S2. If a signal including the charging information is newly received in a specified period, the specified period is further awaited, and if the charging information is not newly received after the specified period, control is passed to step S2. If the signal including the charging information is newly received from the equipment device 2b in the specified period, the specified period is further awaited, and if the charging information is not newly received after the specified period, control is passed to step S2. The determination of the equipment device to be charged is not limited to the method above, and another method may be used.

In step S2, the control unit 21 refers to the power reception information and judges whether or not the number of equipment devices arranged in the power transmitting device 1 is one. When only a single equipment device is arranged, control is passed to step S3 (YES). when more than one equipment device is, control is passed to step S4 (NO). For example, when the control unit 21 refers to the power reception information 72 in FIG. 7D, it is detected that the three equipment devices 2a, 2b, and 2c are arranged in the power transmitting device 1. Since the number of the equipment devices is larger than 1, control is passed to step S4.

In step S3, when there is one, the control unit 21 sets the transmitting power. When there is one, the control unit 21 obtains the transmitting power by using the charging power of the power reception information, and the efficiency of the efficiency information stored in the storage unit 22. The transmitting power may be expressed by the equation 3.

transmitting power=charging power/efficiency     equation 3

Efficiency information 73 in FIG. 7E is an example of efficiency information. The efficiency information 73 in FIG. 7E includes the information stored in "ID" and "EFFICIENCY". It is used when the number of equipment device to be used is one and when the charging power and the efficiency of each of the equipment devices to be charged are the same. The "ID" stores the information for identification of an equipment device. In the present embodiment, "A", "B", "C", "D", "E", "F", "G", "H", . . . are stored as the information to be identified. The "EFFICIENCY" stores the efficiency corresponding to each equipment device. The efficiency may be obtained using, for example, the electric power supplied to the power supply unit 25 of the power transmitting device 1 from the external power supply, and the electric power supplied to the battery of the charging unit 36 of the equipment device 2. In the present embodiment, "0.8" indicating 80%, "0.9" indicating 90%, and "0.85" indicating 85% are stored as the information about the efficiency.

The control unit 21 refers to, for example, the power reception information 72, acquires "50" indicating 50 W as charging power corresponding to the identification information "A", and refers to the efficiency information 73, and acquires "0.8" indicating 80% as the efficiency corresponding to the identification information "A". Then, the control unit 21 calculates charging power/efficiency, and obtains the transmitting power of 62.5 W. Next, the control unit 21 sets the electric power output from the power supply unit 25 to 62.5 W.

In step S4, the control unit 21 refers to the power reception information and judges whether or not the charging power of a plurality of equipment devices is the same and the efficiency is also the same. If they are the same, control is passed to step S5 (YES). If they are different, control is passed to step S6 (NO).

In step S5, When the charging power of a plurality of equipment devices is the same, and the efficiency is also the same, the control unit 21 sets the transmitting power. The transmitting power when the charging power of a plurality of equipment devices is the same is obtained using the charging power of power reception information, the number of equipment devices to be charged, and the efficiency of the efficiency information stored in the storage unit 22. The transmitting power may be expressed by the equation 4.

$$\text{transmitting power} = (\text{charging power}/\text{efficiency}) \times \text{number of equipment devices} \quad \text{equation 4}$$

For example, when the number of equipment devices to be charged and stored in power reception information is 3, and the charging power corresponding to each equipment device is 5 W, and the efficiency is 0.8 (80%), the transmitting power of 18.75 W is obtained by the equation 4. Next, the control unit 21 sets the electric power output from the power supply unit 25 to 18.75 W.

In step S6, the control unit 21 refers to the power reception information and selects an equipment device other than the equipment device having the maximum charging power. For example, the control unit 21 refers to the "CHARGING INFORMATION" of the power reception information 72, and selects an equipment device other than the equipment device having the maximum charging power. In the present embodiment, since the equipment device having the maximum charging power has the identification information of "A", the equipment devices having the identification information of "B" and "C" are selected.

In step S7, the notification that the resonance frequency or the Q value of the power receiving unit 35 of each equipment device selected by the control unit 21 is varied is transmitted to each equipment device. In step S7, the control unit 21 refers to the combination information using the received identification information, and acquires the variable information corresponding to the combination of the equipment devices to be simultaneously charged. The variation of the resonance frequency or the Q value of each equipment device changes, for example, the capacitance of the LC resonance circuit 41 in FIG. 4A in the case of the magnetic field resonance, thereby changing the resonance frequency. In the case of the electric field resonance, the inductance of the CL resonance circuit 42 in FIG. 4B is changed, thereby changing the resonance frequency.

Described below is the combination information. FIG. 8 illustrates an embodiment of the data structure of combination information. Combination information 81 illustrated in FIG. 8 is used when the capacitance of the LC resonance circuit 41 in magnetic field resonance is changed. The combination information 81 includes the information stored in "COMBINATION OF EQUIPMENT DEVICES", "VARIABLE INFORMATION", AND "EFFICIENCY INFORMATION". "COMBINATION OF EQUIPMENT DEVICES" stores a combination of equipment devices. In the present embodiment, the combination of three different equipment devices corresponding to the identification information "A", "B", and "C" is stored. The combination of "A" and "B", the combination of "A" and "C", the combination of "B" and "C", the combination of "A", "A", and "B", the combination of "B", "B", and "C", . . . are stored. In the present embodiment, the combination of three units is described, but the number of units is not limited to three.

"VARIABLE INFORMATION" stores the information that the resonance frequency or the Q value of reach equipment device is varied as associated with the information stored in the "COMBINATION OF EQUIPMENT DEVICES". In the present embodiment, "CA", "CB", "CB1", "CB2", "CB3", "CB4", "CC1", "CC2", "CC3", "CC4", "CC5", "CC6", . . . are stored as variable information. "CA" is a value used to set the capacitance of the LC resonance circuit 41 of the power receiving unit 35 of the equipment device corresponding to the identification information "A". The value indicated by "CA" is the value for varying the resonance frequency f1 of the LC resonance circuit 41 to the frequency equal to the power transmitting frequency f0. "CB", "CB1", "CB2", "CB3", and "CB4" are the values used to set the capacitance of the LC resonance circuit 41 of the power receiving unit 35 of the equipment device corresponding to the identification information "B". "CC1", "CC2", "CC3", "CC4", "CC5", and "CC6" are the values used to set the capacitance of the LC resonance circuit 41 of the power receiving unit 35 of the equipment device corresponding to the identification information "C". The value used to set the capacitance of the equipment device corresponding to the identification information "B" and "C" for varying the resonance frequency of the LC resonance circuit 41 to the frequency different from the power transmitting frequency f0. That is, it is the value for changing the resonance frequency of the Q value corresponding to the power transmitting frequency f0 in the LC resonance circuit 41. However, when the equipment device having the maximum charging power is an equipment device corresponding to the identification information "B", the resonance frequency f1 of the LC resonance circuit 41 is varied to the frequency equal to the power transmitting frequency f0. In the present embodiment, the value indicated by "CB" is used.

It is preferable that the resonance frequency of the LC resonance circuit 41 of each equipment device is set equal to the power transmitting frequency f0 as the initial value at the start of charging. By setting the resonance frequency equal to the power transmitting frequency f0 in frequency, the varying process for the same frequency is unnecessary when a single equipment device is charged, when a plurality of equipment devices having the same shpoand efficiency are to be charged, and when the equipment device having the maximum charging power in a plurality of equipment devices is to be charged.

Furthermore, it is preferable that, as the variable information in the case of electric field resonance, the information for varying the inductance of the coil Lvr1 of the CL resonance circuit 42 of the power receiving unit 35 is stored in the combination information.

Furthermore, in the case of the CL resonance circuit 51 illustrated in FIG. 5, the information for varying the inductance of the coil Lvr1 and the capacitance depending on the condensers C1 through C4 is stored in the combination information.

"EFFICIENCY INFORMATION" stores the information about the efficiency of each equipment device as associated with "COMBINATION OF EQUIPMENT DEVICES". In the present embodiment, "EA1" through "EA7", "EB1" through "EB6", "EC1" through "EC6", . . . are stored as the efficiency information. "EA1" through "EA7" are values indicating the efficiency according to the identification information "A". "EB1" through "EB6" are values indicating the efficiency corresponding to the identification information "B". "EC1" through "EC6" are values indicating the efficiency corresponding to the identification information "C".

The method of determining the variable information and the efficiency information about the equipment device other than the equipment device having the maximum charging power are described later.

Described below is the case in step S7 in which, for example, the equipment device A having the charging power of 50 W, the equipment device B having the charging power of 5 W, and the equipment device C having the charging power of 3 W are simultaneously charged. The control unit 21 refers to the combination information 81 in FIG. 8 according to the power reception information 72 in FIG. 7D, and acquires the variable information "CA", "CB4", and "CC4" associated with "A", "B", and "C" of "COMBINATION OF EQUIPMENT DEVICES". Then, the control unit 21 generates a notification (transmission data) including the variable information "CB4" for notification to the equipment device B and the identification information for identification of the equipment device B, and a notification (transmission data) including variable information "CC4" for notification to the equipment device C and the identification information for identification of the equipment device C. Then, each notification generated through the communication unit 23 and the antenna 24 are transmitted to the equipment devices B and C. When the resonance frequency of the equipment device A is not equal to the power transmitting frequency, a notification including the variable information "CA" and the identification information for identification of the equipment device A is transmitted also to the equipment device A.

In step S8, the control unit 21 sets the transmitting power when the charging power of a plurality of equipment devices is different or when the efficiency is different. The transmitting power when the charging power of a plurality of equipment devices is different or when the efficiency is different is obtained using each charging power of the power reception information and the efficiency corresponding to each equipment device of the combination information stored in the storage unit 22. The transmitting power may be expressed by the equation 5.

transmitting power=(charging power 1/efficiency 1)+
(charging power 2/efficiency 2)+(charging power
3/efficiency 3)+ . . .                        equation 5

For example, in the equipment devices A, B, and C which are stored in the power reception information and are to be charged, when the charging power of the equipment device A is PA and the efficiency is EA6, the charging power of the equipment device B is PB and the efficiency is EB5, and the charging power of the equipment device C is PC and the efficiency is EC4, the transmitting power is expressed by the following equation 6.

transmitting power=(PA/EA6)+(PB/EB5)+(PC/EC4)    equation 6

Next, the control unit 21 sets the 25 so that the electric power output from the power supply unit 25 may be the electric power expressed by the equation 6. The method of obtaining the transmitting power is not limited to the above-mentioned method. The number of equipment devices is not limited to 3.

In step S9, the control unit 21 instructs the power supply unit 25 to start the transmission of electric power. Then, the power supply unit 25 outputs the set electric power. If an equipment device is newly added during the process, control is passed to step S1. If there is an equipment device for which the charging has been completed, control is passed to step S1.

Described below is the method of determining the variable information and the efficiency information about the equipment device other than the equipment device having the maximum charging power.

One of the determining methods is to determine the variable information and the efficiency information using a practical system. Otherwise, an equivalence circuit of a practical system is analyzed using a circuit simulator etc., and then the variable information and the efficiency information may be determined.

Figure 9B:
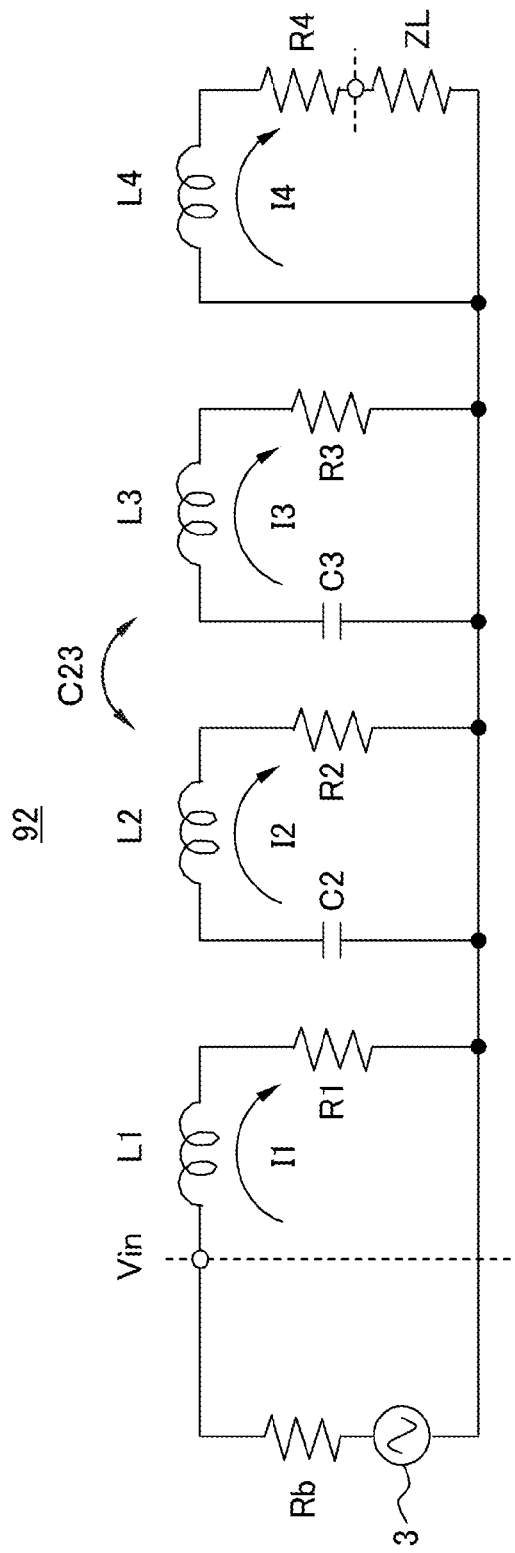

FIGS. 9A and 9B illustrates an embodiment of an equivalence circuit of a non-contact charging system of magnetic field resonance and electric field resonance. An equivalence circuit 91 in FIG. 9A is a non-contact charging system of magnetic field resonance using four coils explained with reference to FIG. 1. An equivalence circuit 92 in FIG. 9B is a non-contact charging system using four coils of electric field resonance.

The equivalence circuit 91 is described below. The circuit configured by the coil L1 and the resistor R1 includes the power supply coil 4 etc. described above with reference to FIG. 1. The circuit configured by the coil L2, the condenser C2, and the resistor R2 is a circuit having the power transmission resonance coil 5 etc. described above with reference to FIG. 1. The circuit configured by the coil L3, the condenser C3, and the resistor R3 includes the power reception resonance coils 6a, 6b, and 6c described above with reference to FIG. 1. The circuit configured by the coil L4, the resistor R4, and the load ZL includes the power take-up coil 7a and the load ZLa, the power take-up coil 7b and the load ZLb, and the power take-up coil 7c and the load ZLc. The resistor Rb is located between the power source unit 3 and the power supply coil 4. The equivalence circuit 91 includes a mutual inductance M12 of the coil L1 and the coil L2, a mutual inductance M23 of the coil L2 and the coil L3, and a mutual inductance M34 of the coil L3 and the coil L4. Illustrated furthermore are electric currents I1 through I4.

Explained below is the equivalence circuit 92. The circuit configured by the coil L1 and the resistor R1 includes the power supply coil 4 described above with reference to FIG. 1. The circuit configured by the coil L2, the condenser C2, and the resistor R2 includes the power transmission resonance coil 5 described above with reference to 1. The circuit configured by the coil L3, the condenser C3, and the resistor R3 includes the power reception resonance coils 6a, 6b, and 6c described above with reference to FIG. 1. The circuit configured by the coil L4, the resistor R4, and the resistor ZL includes the power take-up coil 7a and the load ZLa, the power take-up coil 7b and the load ZLb, and the power take-up coil 7c and the load ZLc described above with reference to FIG. 1. The resistor Rb is located between the power source unit 3 and the power supply coil 4. The equivalence circuit 92 includes a mutual capacitance C23 of the condenser C2 and the condenser C3, and electric currents I1 through I4.

In the magnetic field resonance or electric field resonance system, an equivalence circuit is generated also when the circuit configured by the coil L1 and the resistor R1 is not used, or when the circuit configured by the coil L4 and the resistor R4 is not used. Then, it is considered that the variable information and the efficiency information are determined for the generated equivalence circuit using a circuit simulator etc.

Figure 10:
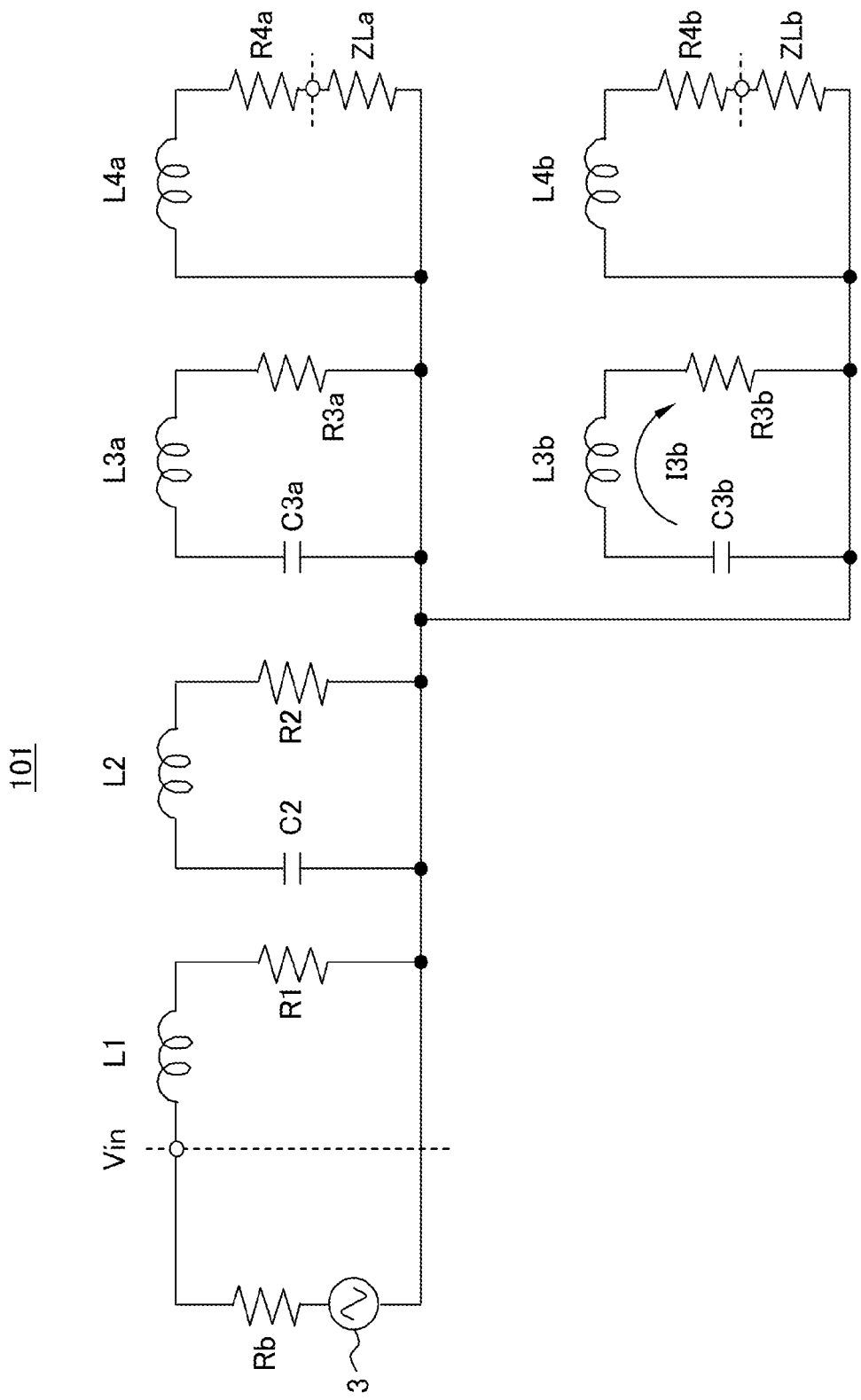
FIG. 10 illustrates an embodiment of an equivalence circuit of a non-contact charging system of magnetic field resonance.

FIG. 10 illustrates an embodiment of an equivalence circuit of a non-contact charging system of magnetic field resonance. Described in the present embodiment is the case in which there are two equipment devices to be simultaneously charged. Although there are a plurality of equipment devices, the circuit configured by the coil L1 and the resistor R1 on the power transmitting device 1 side and the circuit configured by the coil L2, the condenser C2, and the resistor R2 are the same as the equivalence circuit 91.

The LC resonance circuit of the power receiving unit 35 on the equipment device A side in FIG. 10 is configured by the coil L3a, the condenser C3a, and the resistor R3a, the power take-up coil is configured by the coil L4a and the resistor R4a. The load on the equipment device A side is indicated by the load ZLa. The LC resonance circuit of the power receiving unit 35 on the equipment device B side is configured by the coil L3b, the condenser C3b, and the resistor R3b, and the power take-up coil is configured by the coil L4b and the resistor R4b. The load on the equipment device B side is indicated by the load ZLb. In the present embodiment, there are two equipment devices, but the number of the equipment devices is not limited to two.

Figure 11:
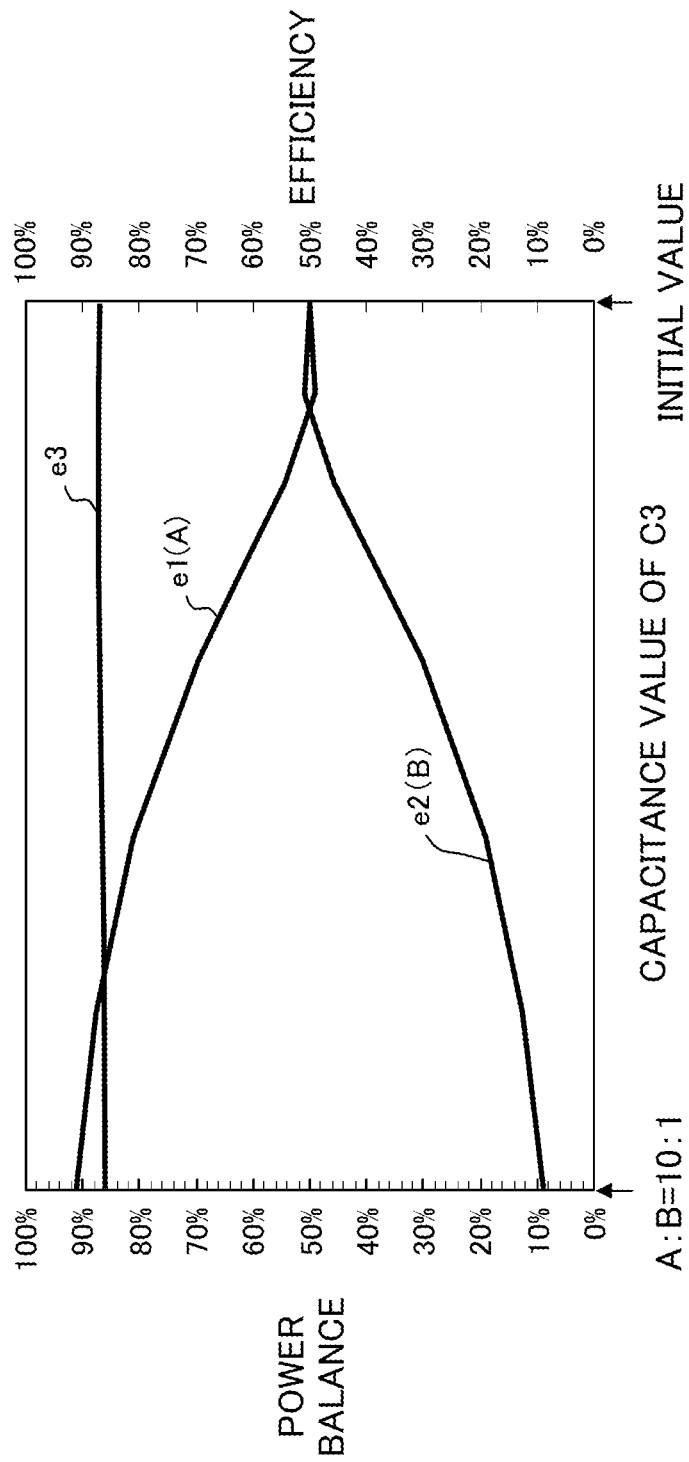
FIG. 11 is an example of a result of a simulation.

FIG. 11 is an example of a result of a simulation using the equivalence circuit illustrated in FIG. 10.

FIG. 11 is an example of a result of a simulation. The vertical axis indicates the power balance and the efficiency, and the horizontal axis indicates the capacitance value of the condenser C3b of the equipment device B. The curve e1 illustrates a result of a simulation when the capacitance of the condenser C3 of an equivalence circuit 101 corresponding to the power receiving device of the equipment device A is varied. The curve e2 illustrates a result of a simulation when the capacitance of the condenser C3 of an equivalence circuit 101 corresponding to the power receiving device of the equipment device B is varied. For example, when the charging power of the equipment device A is 50 W, and the charging power of the equipment device B is 5 W, the resonance frequency of the LC resonance circuit of the equipment device A is not varied as the power transmitting frequency, and the capacitance of the condenser C3b of the equipment device B is varied. As illustrated in FIG. 11, the charging power of the equipment device A increases by decreasing the capacitance of the condenser C3b, thereby reducing the charging power of the equipment device B. Furthermore, there is no large change in the curve e3 which indicates the entire efficiency.

By performing the above-mentioned simulation on the combination of each equipment device, the variable information and the efficiency information about each equipment device of each combination may be obtained.

Figure 12B:
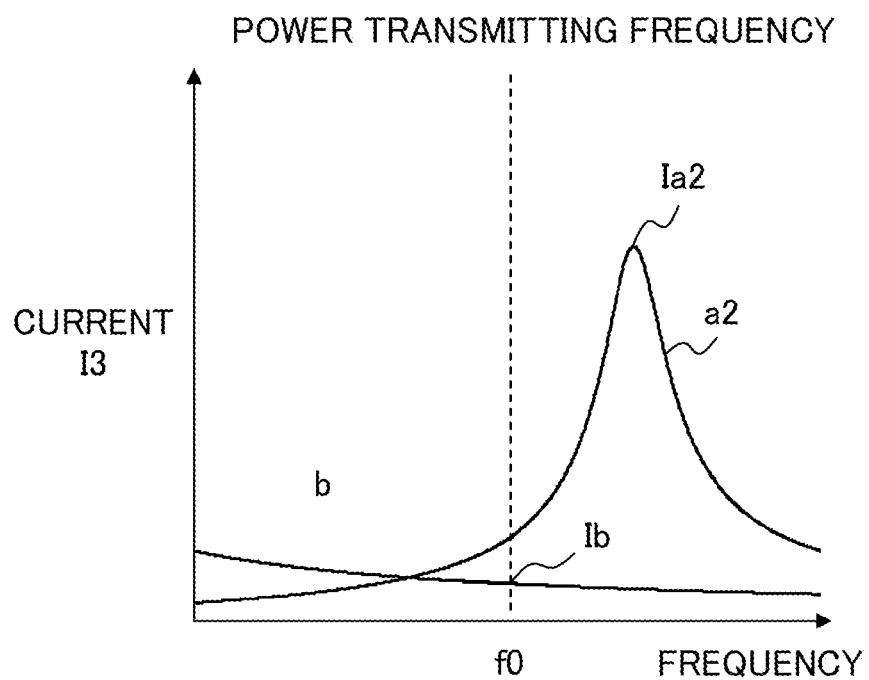

Furthermore, the Q value of the LC resonance circuit configured by the coil L3b, the condenser C3b, and the resistor R3b of the power receiving unit 35 of the equipment device B may be expressed using the electric current I3b illustrated in the LC resonance circuit. FIGS. 12A and 12B are an example of the relationship between a power transmitting frequency and a Q value of a power receiving unit. A graph 121 illustrates the relationship between resonance frequency and the electric current I3 when the coil L3 of the equivalence circuit 91 is varied. The curve a1 indicates the case in which an AC current is input centering the power transmitting frequency f0 to the circuit configured by the coil L3, the condenser C3, and the resistor R3. In the present embodiment, the value of the capacitance of the condenser C3 of the circuit is set so that the resonance frequency of the circuit and the power transmitting frequency f0 indicate the same value. The curve b indicates the change of the electric current I3 when a DC current is input to the circuit configured by the coil L3, the condenser C3, and the resistor R3. The Q value of the power transmitting frequency of the graph 121 may be indicated by Ia1/Ib. Ia1 is the value of the electric current I3 when the resonance frequency is equal to the power transmitting frequency f0. Ib indicates the electric current at the power transmitting frequency f0.

A graph 122 illustrates the relationship between resonance frequency and the electric current I3 when the coil L3 of the equivalence circuit 91 is varied. The curve a2 indicates the case in which an AC current is input centering the power transmitting frequency f0 to the circuit configured by the coil L3, the condenser C3, and the resistor R3. In the present embodiment, the value of the capacitance of the condenser C3 of the circuit is set so that the resonance frequency of the circuit and the power transmitting frequency f0 indicate different values. The curve b indicates the change of the electric current I3 when a DC current is input to the circuit configured by the coil L3, the condenser C3, and the resistor R3. The Q value of the power transmitting frequency of the graph 121 may be indicated by Ia1/Ib. Ia2 is the value of the electric current I3 when the resonance frequency is not equal to the power transmitting frequency f0. Ib indicates the electric current at the power transmitting frequency f0. That is, the Q value may be varied by varying the resonance frequency.

The operation of the equipment device 2 is explained below with reference to FIG. 13.

FIG. 13 is a flowchart of an embodiment of an operation of an equipment device. In step S131, the control unit 31 transmits charging information to the power transmitting device 1. The control unit 31 acquires, for example, the identification number assigned to each equipment device stored in the storage unit 32 and the charging power for each equipment device, and generates charging information. Then, the control unit 31 forwards the charging information to the communication unit 33, and transmits the information to the power transmitting device 1 through the antenna 34.

In step S132, after transmitting the charging information to the power transmitting device 1, the control unit 31 judges whether or not a notification transmitted from the power transmitting device 1 has been received. If the notification has been transmitted, then control is passed to step S133 (YES). In the notification has not been transmitted, the system enters a standby state (NO). The notification (transmission data) is transmitted by the power transmitting device 1 in step S7 in FIG. 6. If the identification information included in the received notification is the same as the equipment device which has received the notification, then it is judged that the notification has been received.

In step S133, according to the variable information included in the notification received by the control unit 31, the Q value variable information is referred to and the Q value is changed. The Q value variable information is stored in the storage unit 32, and includes the information stored in "VARIABLE INFORMATION" and "SET VALUE". FIGS. 14A, 14B and 14C illustrate an embodiment of the data structure of Q value variable information. Q value variable information 141 is stored in the storage unit 32 by, for example, associating the set value which varies the capacitance of the power receiving unit 35 of the equipment device A with the variable information. Q value variable information 142 is stored in the storage unit 32 by, for example, associating the set value which varies the capacitance of the power receiving unit 35 of the equipment device B with the variable information. Q value variable information 143 is stored in the storage unit 32 by, for example, associating the set value which varies the capacitance of the power receiving unit 35 of the equipment device C with the variable information. "VARIABLE INFORMATION" stores the value for setting the capacitance of the LC resonance circuit 41 of the power receiving unit 35 of each equipment device. In the present embodiment, values "CA", "CA1", "CA2", . . . , "CA8", . . . for setting the capacitance are stored as "VARIABLE INFORMATION" about the equipment device A. Values "CB", "CB1", "CB2", . . . , "CB8", . . . for setting the capacitance are stored as "VARIABLE INFORMATION" about the equipment device B. Values "CC", "CC1", "CC2", . . . , "CC8", . . . for setting the capacitance are stored as "VARIABLE INFORMATION" about the equipment device C. "SET VALUE" stores control data for varying the capacitance. For example, the data for opening and closing the switches SW1 through SW4 for varying the capacitance of the LC resonance circuit 41 in FIG. 4A is stored. In the present embodiment, as set values for varying the switches as the "SET VALUE" of the equipment device A, "data A0", "data A1", "data A2", . . . , "data A8", . . . are stored. As set values for varying the switches as the "SET VALUE" of the equipment device B, "data B0", "data B1", "data B2", ..., "data B8", ... are stored. As set values for varying the switches as the "SET VALUE" of the equipment device C, "data C0", "data C1", "data C2", ..., "data C8", ... are stored.

In the case of electric field resonance, the control data for varying the inductance of the CL resonance circuit 42 in FIG. 4B is stored.

Furthermore, in the case of the CL resonance circuit 51 in FIG. 5, the control data for varying the capacitance or the inductance is stored.

In step S134, when the control unit 31 detects the completion of the change of the Q value, the process enters the charging start state. The power transmitting device 1 may be notified of the charging start state.

In step S135, the control unit 31 detects the completion of the charging. Upon detection of the charging, the control unit 31 terminates (YES) the process after completing the charging. When the completion of the charging is not detected (NO), the charging is continued. The completion of the charging is performed by, for example, measuring the output voltage of the battery, and completing the charging if the threshold is reached or exceeded. The power transmitting device 1 may be notified of the completion of the charging, and the power transmitting device 1 may terminate the charging.

Conventionally, since a certain level of electric power is to be received on the charging table of the power transmitting device, the charging power received by each equipment device may have the same value. Therefore, when an equipment device requiring different charging power is charged, there occurs the problem of excess or deficient electric power. However, according to the present embodiment, appropriate electric power may be supplied to an equipment device requiring different charging power although electric power is to be simultaneously supplied to a plurality of equipment devices requiring different charging power.

Furthermore, as illustrated in FIG. 11, since the electric power balance may be adjusted, a plurality of equipment devices requiring different charging power may be simultaneously charged. In addition, since high efficiency (curve e3) of power transmission may be maintained, the loss at the power transmission may be minimized.

Furthermore, when the ratio of the charging power of the equipment device B is specified as A:B=10:1 in the equipment device A (50 W) and the equipment device B (5 W) on the power reception side, there may be the problem that the power transmission efficiency is extremely degraded if the charging is to be performed with a single equipment device B. Furthermore, there may be the problem of a difficult combination such as A:B=5:1. However, according to the present embodiment, since a resonance frequency or a Q value may be adjusted depending on the electric power balance for a combination, the problem above may be solved.

Although there are a plurality of same equipment devices, the devices may require different charging power depending on the charging state of a battery etc. Furthermore, although there is a power distribution difference on a charging table, necessary charging power may also be different. For example, when the receiving power is large at the center of the charging table, an equipment device of 5 W may be arranged at the center, and an equipment device of 50 W is not to be arranged at the end of the charging table. However, the problem above may be solved by adjusting the resonance frequency or the Q value depending on the power balance by considering the charging state of a battery and the power distribution on the charging table according to the present embodiment.

Described below is the second embodiment.

Figure 16:
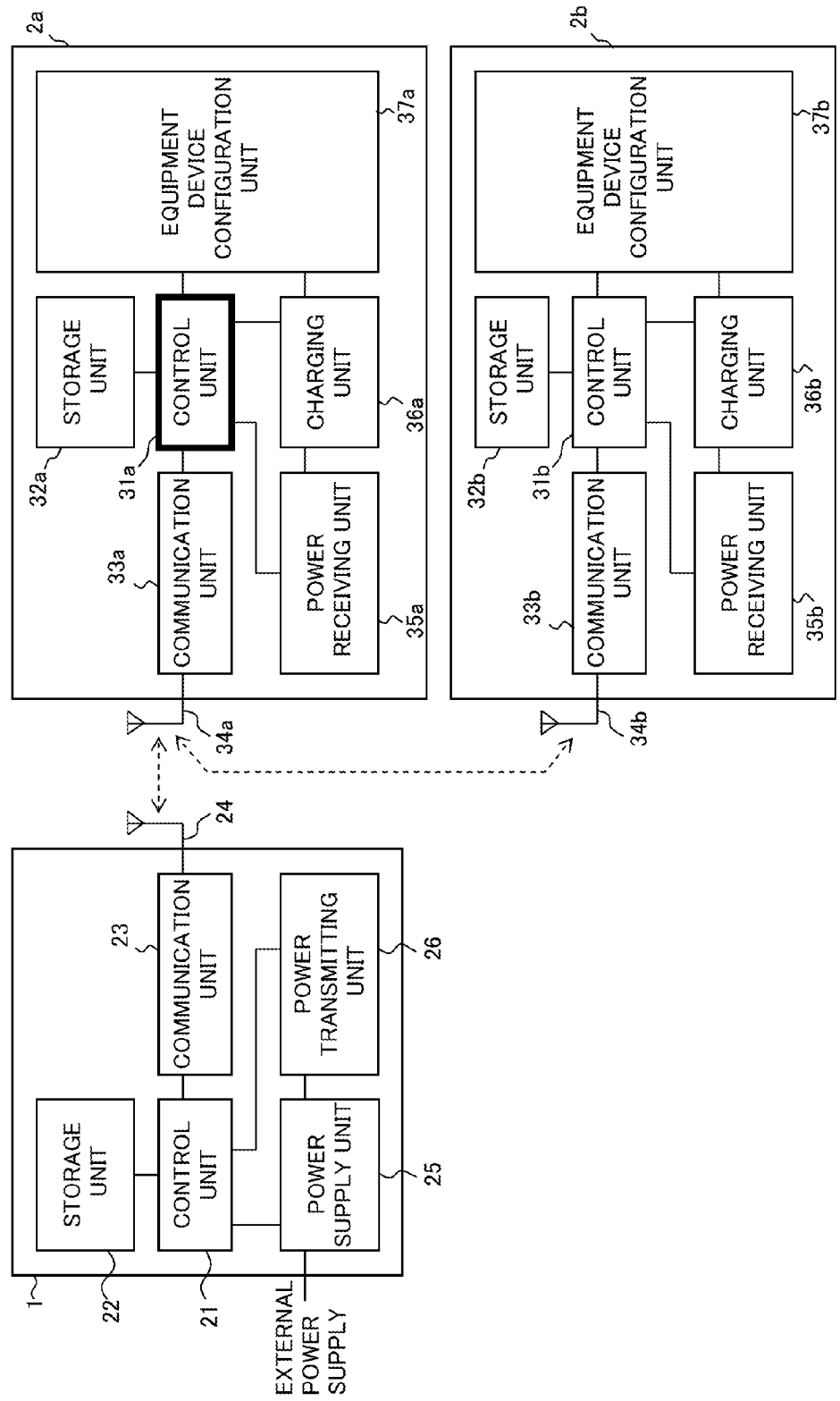
FIG. 16 illustrates an embodiment of a system having a power transmitting device and a power receiving device according to the second embodiment.

FIG. 15 illustrates an embodiment of a system having a power transmitting device and a power receiving device according to the first embodiment. FIG. 16 illustrates an embodiment of a system having a power transmitting device and a power receiving device according to the second embodiment. In the first embodiment, the power transmitting device 1 in FIG. 15 leads transmitting variable information to each equipment device. That is, the control unit 21 in FIG. 15 obtains variable information, and transmits the variable information to each equipment device.

In the second embodiment, one (first equipment device) of the equipment devices leads controlling the power transmitting device and another equipment device (second equipment device). In the example in FIG. 16, the equipment device 2a (first equipment device) leads transmitting the variable information to the equipment device 2b (second equipment device) as an equipment device other than the equipment device 2a. The equipment device 2a transmits to the power transmitting device 1 the necessary information to supply transmitting power to be transmitted to the equipment devices 2a and 2b. Then, the power transmitting device 1 transmits electric power to the equipment devices 2a and 2b.

The control unit 31a in FIG. 16 controls each unit of the equipment device 2a. When the equipment device 2a is the first equipment device in the equipment devices illustrated in FIG. 16, the control unit 31a obtains the variable information about the equipment devices 2a and 2b, and transmits the variable information to the equipment device 2b.

The control unit 31a acquires the charging information stored in the storage unit 32a including the identification information for identification of the equipment device 2a, and the information about the charging power associated with the equipment device 2a. The control unit 31a acquires the charging information transmitted from the equipment device 2b through the communication unit 33a.

The control unit 31a obtains the transmitting power using the charging power and the efficiency corresponding to the equipment devices 2a and 2b, and transmits the information about the transmitting power to the power transmitting device 1. The charging power and the efficiency corresponding to the equipment devices 2a and 2b may be transmitted from the equipment device 2a, and the transmitting power may be obtained by the power transmitting device 1. For example, the transmitting power may be obtained using the acquired charging power and efficiency corresponding to each equipment device by referring to the efficiency associated with the identification information using, each piece of acquired identification information.

Furthermore, the control unit 31a generates the variable information that the resonance frequency of the resonance circuit or the Q value of each of the power receiving unit 35a of the equipment device 2a and the power receiving unit 35b of the equipment device 2b is varied. For example, the equipment device 2a refers to the combination information which is stored in the storage unit 32a and includes the combination of one or more equipment devices and the variable information of each equipment device associated with each combination of one or more equipment devices, and selects the variable information associated with each equipment device using the acquired identification information.

When the resonance frequency of the equipment device 2a or the Q value is varied, the resonance frequency of the resonance circuit or the Q value is varied using the variable information. When the resonance frequency of the equipment device 2b or the Q value is varied, the variable information corresponding to the equipment device 2b is transmitted from the equipment device 2a. Upon receipt of the variable information, the equipment device 2b varies the resonance frequency of the resonance circuit or the Q value using the variable information.

When the equipment device 2a is an equipment device having the maximum charging power, the resonance frequency of the resonance circuit of the power receiving unit 35a is varied to the power transmitting frequency. When the equipment device 2a is an equipment device other than the equipment device having the maximum charging power, the resonance frequency of the resonance circuit of the power receiving unit 35a is varied to the frequency at which the charging power corresponding to the equipment device other than the equipment device having the maximum charging power may be supplied from the transmitting power transmitted from the power transmitting device 1.

The control unit 31b in FIG. 16 controls each unit of the equipment device 2b. The control unit 31b generates the charging information including the identification information for identification of an equipment device and the information about the charging power associated with an equipment device. Then, the control unit 31b transmits the charging information from the communication unit 33b to the communication unit 33a. The control unit 31b acquires the variable information transmitted from the equipment device 2a through the communication unit 33b.

When the equipment device 2b is an equipment device having the maximum charging power, the resonance frequency of the resonance circuit of the power receiving unit 35b is varied to the power transmitting frequency. When the equipment device 2b is an equipment device other than the equipment device having the maximum charging power, the resonance frequency of the resonance circuit of the power receiving unit 35b is varied to the frequency at which the charging power corresponding to the equipment device other than the equipment device having the maximum charging power may be supplied from the transmitting power transmitted from the power transmitting device 1.

The control unit 21 in FIG. 16 controls each unit of the power transmitting device 1. Furthermore, the control unit 21 in FIG. 16 acquires the information about the transmitting power from the equipment device 2a. Furthermore, the charging power and the efficiency corresponding to the equipment devices 2a and 2b are received from the equipment device 2a, thereby obtaining the transmitting power. Then, the control unit 21 controls the transmission of electric power.

Described below is the operation of a primary equipment device (first equipment device having the power receiving device).

Figure 17:
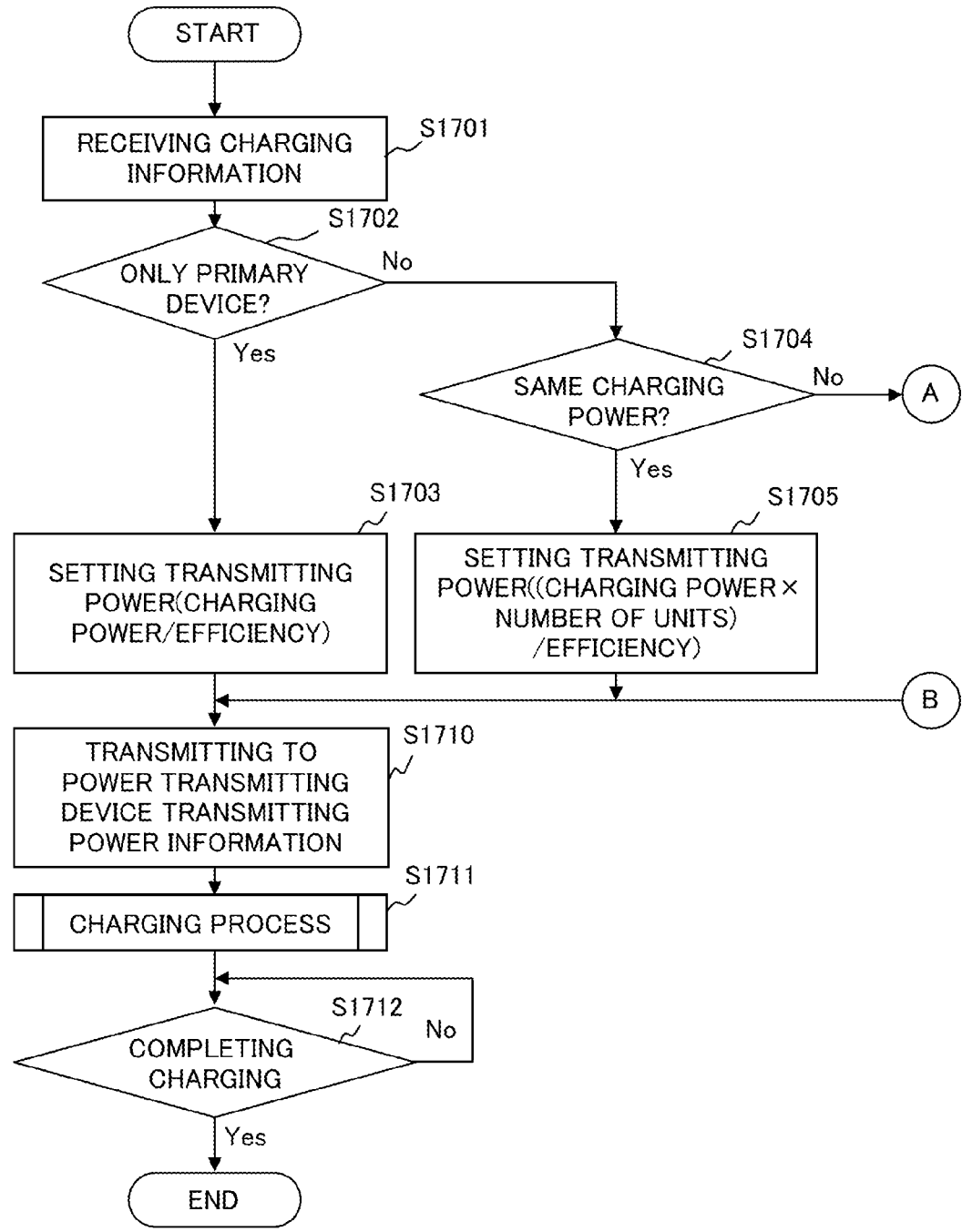
FIG. 17 is a flowchart of an embodiment of an operation of a primary equipment device.
Figure 18:
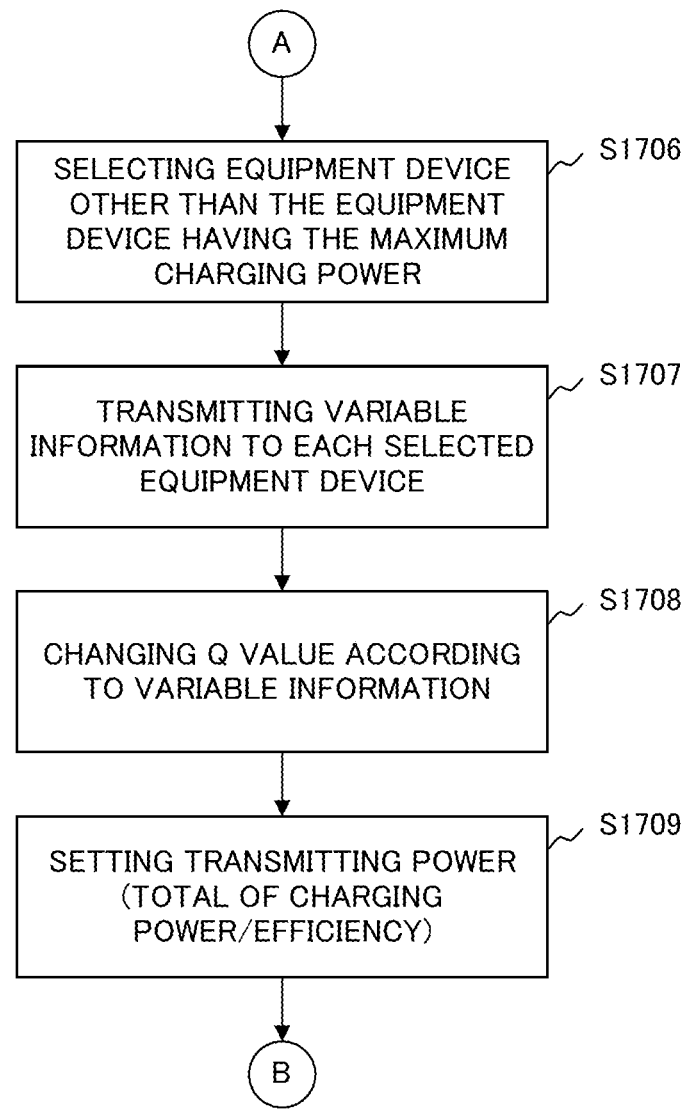
FIG. 18 is a flowchart of an embodiment of an operation of a primary equipment device.

FIGS. 17 and 18 are flowcharts of an embodiment of the operation of a primary equipment device. In step S1701, the control unit of the primary first equipment device acquires the charging information stored in the first equipment device and the charging information transmitted from the second equipment device using, for example, a wireless communication and received by the first equipment device. For example, when the first equipment device is the equipment device 2a, and the second equipment device is the equipment device 2b, the communication unit 33a forwards to the control unit 31a the charging information about the equipment device 2b included in the received signal.

Then, in step S1701, the control unit 31a stores the charging information received from the equipment device 2b in the power reception information about the storage unit 32a. The power reception information includes the identification information for identification of an equipment device and the information about the charging power of each equipment device. Refer to FIGS. 7A-7E for the charging information and the power reception information.

If the control unit 31a confirms that a signal including charging information is not transmitted from an equipment device for a specified period after the control unit 31a receives the signal including the charging information from the equipment device in step S1701, control is passed to step S1702. That is, the equipment device to be charged is confirmed. For example, when the equipment devices 2a and 2b are arranged in the power transmitting device 1, and if no new charging information is received after the lapse of a specified period after acquiring the charging information 71a and 71b, then control is passed to step S1702. Furthermore, when a signal including charging information is newly received in a specified period from the equipment device 2c, and if no new charging information is received after a specified period after a certain waiting period, then control is passed to step S1702. The determination of an equipment device to be charged is not limited to the method above, but another method may be used.

Figure 7A:
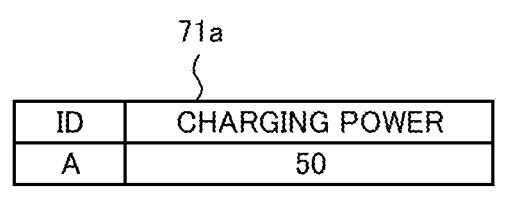
Figure 7B:
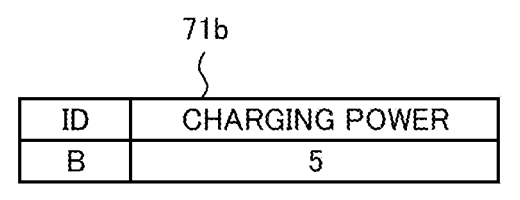
Figure 7C:
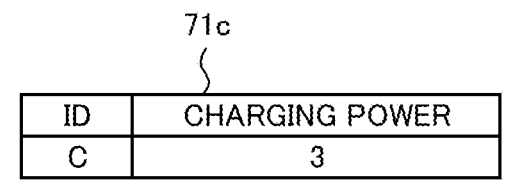
Figure 7D:
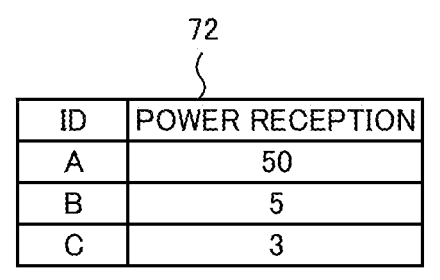

In step S1702, the control unit of a primary equipment device refers to the power reception information, and judges whether or not it is only the primary equipment device that is arranged in the power transmitting device 1. If only the primary equipment device is arranged (YES), control is passed to step S1703. If there is another equipment device other than the primary equipment device that is arranged in the power transmitting device 1 (NO), then control is passed to step S1704. For example, when the power reception information 72 in FIG. 7D is referred to, it is detected that three equipment devices, that is, the equipment devices 2a, 2b, and 2c, are arranged in the power transmitting device 1, there are equipment devices other than the primary equipment device, and control is passed to step S1704.

In step S1703, the control unit of the primary equipment device sets the transmitting power. The transmitting power for only the primary equipment device is obtained using the charging power of the power reception information, and the equipment device of the efficiency information stored in the storage unit 32a. The transmitting power may be expressed by the equation 3.

The control unit 31a refers to, for example, the power reception information 72, acquires "50" indicating 50 W as the charging information corresponding to the identification information "A", and refers to the efficiency information 73 and acquires "0.8" indicating 80% as the efficiency corresponding to the identification information "A". Then, the transmitting power 62.5 is obtained by calculating the charging power/efficiency.

In step S1704, the control unit of the primary equipment device refers to the power reception information, and judges whether or not the charging power of a plurality of equipment devices is the same, and the efficiency is the same. If they are the same (YES), control is passed to step S1705. If they are different (NO), control is passed to step S1706 in FIG. 18.

In step S1705, the control unit of the primary equipment device sets the transmitting power when the charging power of a plurality of equipment devices is the same, and the efficiency is also the same. The transmitting power when the charging power of a plurality of equipment devices is the same is obtained using the charging power of the power reception information, the number of the equipment devices to be charged, and the efficiency of the efficiency information stored in the storage unit 32a. The transmitting power may be expressed by the equipment device 4. For example, if the number of equipment devices to be charged and stored in the power reception information is 3, and the charging power corresponding to each equipment device is all 5 W, and the efficiency is all 0.8 (80%), then the transmitting power of 18.75 W is obtained by the equation 4.

In step S1706 in FIG. 18, the control unit of the primary equipment device refers to the power reception information, and selects an equipment device other than the equipment device having the maximum charging power. For example, the control unit 31a refers to the "CHARGING INFORMATION" about the power reception information 72 and selects an equipment device other than the equipment device having the maximum charging power. In the present embodiment, since an equipment device having the maximum charging power is an equipment device whose identification information is "A", the equipment device whose identification information is "B" and "C" is selected.

In step S1707 in FIG. 18, the control unit of the primary power receiving device transmits a notification of varying the resonance frequency or the Q value of the power receiving unit of each selected equipment device other than a primary equipment device to each of the selected equipment devices. In step S1707, the control unit 31a refers to the combination information using the received identification information, and acquires the variable information corresponding to the combination of simultaneously charged equipment devices.

Described below is the case in which, for example, the equipment device A having the primary charging power of 50 W, the equipment device B having the charging power of 5 W, and the equipment device C having the charging power of 3 W are simultaneously charged in step S1707. The control unit 31a refers to the combination information 81 in FIG. 8 using the power reception information 72 in FIG. 7D, and acquires the variable information "CA", "CB4", and "CC4" associated with "A", "B", and "C" of "COMBINATION OF EQUIPMENT DEVICES". Then, a notification (transmission data) including the variable information "CB4" notified to the equipment device B and the identification information for identification of the equipment device B, and a notification (transmission data) including the variable information "CC4" notified to the equipment device C and the identification information for identification of the equipment device C are generated. Then, the notifications generated through the communication unit 33a and the antenna 34a are transmitted to the equipment devices B and C.

The control unit of an equipment device as a primary equipment device in step S1708 in FIG. 18 refers to the Q value variable information stored in the storage unit 32a using the variable information when it is necessary to vary the resonance frequency or Q value of a primary equipment device, thereby changing the resonance frequency or the Q value.

In step S1709 in FIG. 18, the control unit of the primary equipment device sets the transmitting power when the charging power of a plurality of equipment devices is different or the efficiency is different. The transmitting power when the charging power of a plurality of equipment devices is different or when the efficiency is different is obtained using the charging power of the power reception information and the efficiency corresponding to each equipment device of the combination information stored in the storage unit 32a. The transmitting power may be expressed by the equation 5.

In step S1710, the control unit of a primary equipment device transmits the transmitting power information to the power transmitting device through a communication unit. The control unit 31a transmits the transmitting power information to the power transmitting device 1 through the communication unit 33a.

In step S1711, the control unit of a primary equipment device performs a charging process. For example, when the control unit 31a detects the completion of changing the Q value, control is passed to the charging start state. The charging start state may be notified to the power transmitting device 1.

In step S1712, the control unit of a primary equipment device detects the completion of charging. Upon detection of the completion of the charging, the control unit 31a terminates the charging process (YES). When the control unit 31a does not detect the completion of the charging (NO), it continues the charging. The completion of the charging is performed by, for example, measuring the output voltage of a battery, and when a value not less than a threshold is detected, the charging is completed. The completion of the charging may be notified to the power transmitting device 1, and the power transmitting device 1 may terminate the charging.

Described below is the operation of an equipment device other than a primary equipment device.

Figure 19:
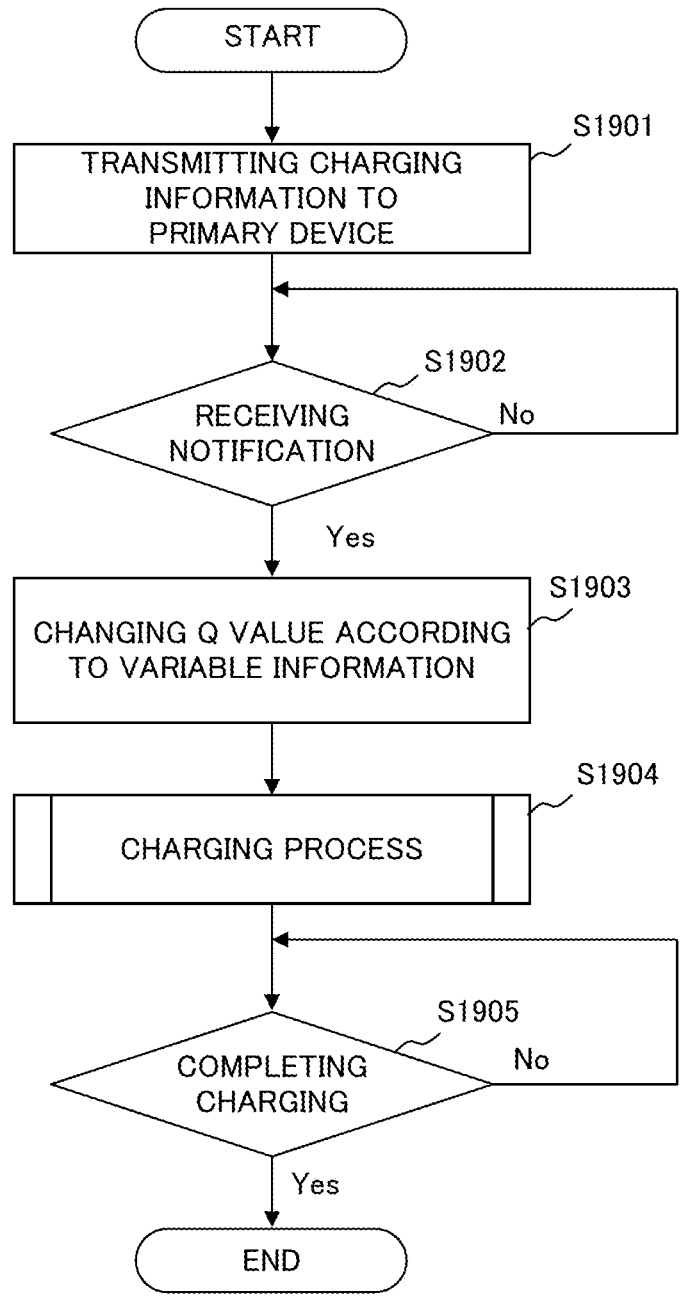
FIG. 19 is a flowchart of an embodiment of an operation of an equipment device other than a primary equipment device.

FIG. 19 is a flowchart of an embodiment of an operation of an equipment device other than a primary equipment device. In the second embodiment, the control unit of an equipment device other than a primary equipment device transmits the charging information to a primary equipment device in step S1901. The control unit 31b acquires, for example, an identification number assigned to each equipment device stored in the storage unit 32b and the charging power for each equipment device, and generates charging information. Then, the control unit 31b forwards the charging information to the communication unit 33b, and transmits the information to the equipment device 2a through the antenna 34b.

In step S1902, after transmitting the charging information to the equipment device 2a, the control unit 31b judges whether or not a notification transmitted from the equipment device 2a has been received. If the notification has been transmitted (YES), then control is passed to step S1903. Unless the notification has been transmitted (NO), then the process enters a standby state. It is judged that the notification has been received if the identification information included in the received notification is the same as the equipment device which has received the notification.

In step S1903, the control unit 31b changes the Q value by referring to the Q value variable information stored in the storage unit 32b using the variable information included in the notification received by the control unit 31b.

In step S1904, when the control unit 31b detects that the change of the Q value has been completed, the unit performs the charging process. The charging start state may be notified to the power transmitting device 1.

In step S1905, the control unit 31b detects the completion of charging. Upon detection of the completion of the charging, the control unit 31b terminates the charging process (YES). When the control unit 31a does not detect the completion of the charging (NO), it continues the charging. The completion of the charging is performed by, for example, measuring the output voltage of a battery, and when a value not less than a threshold is detected, the charging is completed. The completion of the charging may be notified to the power transmitting device 1 through the equipment device 2a, thereby terminating the charging.

Described below is the operation of the power transmitting device according to the second embodiment.

Figure 20:
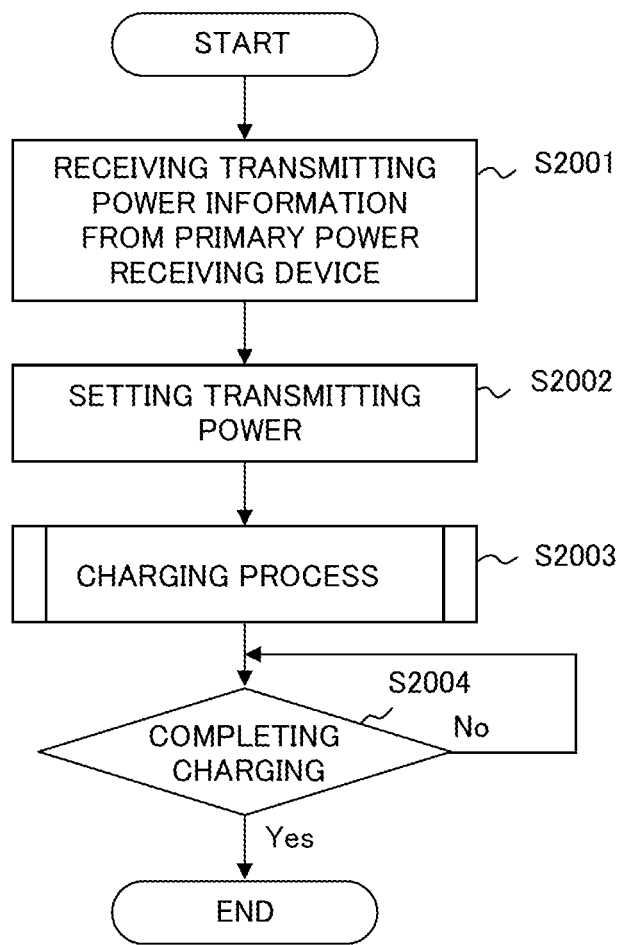
FIG. 20 is a flowchart of an embodiment of an operation of a power transmitting device according to the second embodiment.

FIG. 20 is a flowchart of an embodiment of an operation of a power transmitting device according to the second embodiment. In step S2001, the control unit 21 of the power transmitting device in FIG. 16 receives the transmitting power information from the primary equipment device 2a.

In step S2002, the control unit 21 sets the power transmission which is indicated by the transmitting power information and is to be performed from the power supply unit 25 and the power transmitting unit 26.

In step S2003, upon detection of the completion of the preparation for the transmission of electric power, the control unit 21 performs the charging process. The charging start state may be notified to the equipment device 2a.

In step S2004, the control unit 21 detects the completion of the charging. When the control unit 21 detects the completion of the charging, the unit terminates the charging (YES). Unless the control unit 21 detects the completion of the charging (NO), the charging is continued.

According to the second embodiment, appropriate electric power may be supplied to an equipment device requiring different charging power although electric power is simultaneously supplied to a plurality of equipment devices requiring different charging power.

Since the electric power balance may be adjusted, a plurality of equipment devices requiring different charging power may be simultaneously charged. Furthermore, the loss of transmitting power may be minimized.

According to the second embodiment, the resonance frequency or the Q value depending on the power balance based on the combination may be adjusted.

Furthermore, according to the second embodiment, the resonance frequency or the Q value depending on the power balance may be adjusted with the charging state of a battery or the power distribution on the charging table taken into account.

In addition, the case in which there is one primary equipment device is described above, but a plurality of equipment devices may perform respective divisions of the process described above.

The third embodiment is described below.

Figure 21:
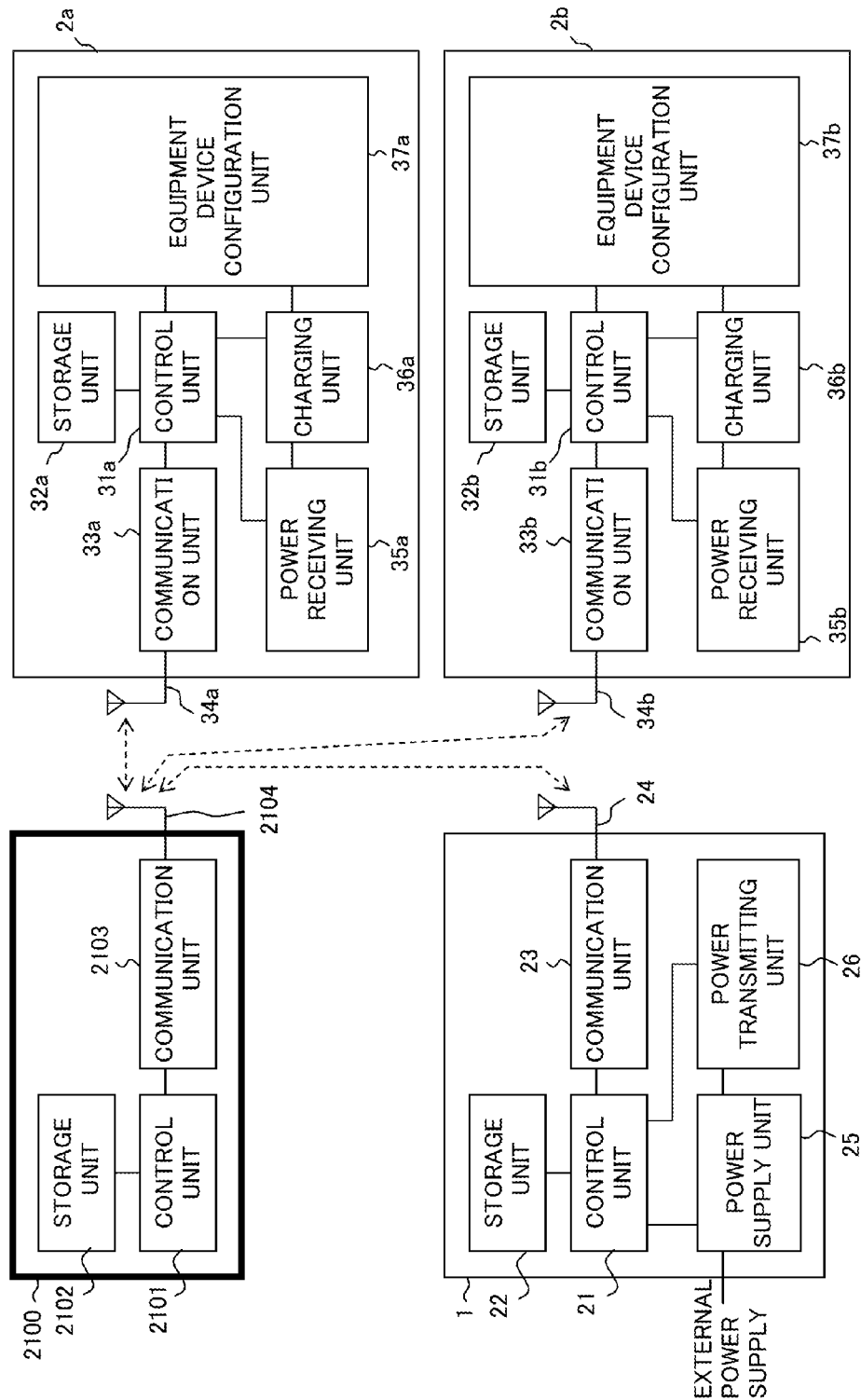
FIG. 21 illustrates an embodiment of a system having a power transmitting device, a power receiving device, and an external device according to the third embodiment.

FIG. 21 illustrates an embodiment of a system having a power transmitting device, a power receiving device, and an external device according to the third embodiment. In the third embodiment, the control for charging the equipment devices 2a and 2b from the power transmitting device 1 illustrated in FIG. 21 is performed by an external device 2100.

The external device 2100 is a device such as a computer, and may communicate with the power transmitting device 1, and the equipment devices 2a and 2b. The external device 2100 may be, for example, a server, a cloud, etc.

A control unit 2101 may be a central processing unit (CPU), a multi-core CPU, a programmable device (field programmable gate array (FPGA), a programmable logic device (PLD), etc.

A storage unit 2102 stores power reception information, efficiency information, combination information, etc. described later. The storage unit 2102 may be memory, a hard disk, etc., for example, read only memory (RAM), flash-ROM, random access memory (RAM), FeRAM, etc. The storage unit 2102 may store data such as a parameter value, a variable, etc., and also may be used as a work area at run time. The storage unit 2102 (non-volatile memory such as ROM, flash-ROM, FeRAM, etc.), stores a program, and the control unit performs a process while reading the program at run time.

A communication unit 2103 is connected to an 2104, and is an interface for wireless communication etc. with the power transmitting device 1, and a communication units of the equipment devices 2a and 2b. For example, it may be an interface for wireless connection such as a wireless local area network (LAN), Bluetooth (registered trademark), etc.

In addition, the external device 2100 may include a recording medium read device and an input/output interface. The recording medium read device controls a read/write of data on a recording medium according to the control of the control unit 2101. Then, it records data which is written under the control of the recording medium read device, and reads data recorded on the recording medium. A removable recording medium may be a magnetic record device, an optical disk, a magneto optical recording medium, semiconductor memory, etc. as a computer-readable and non-transitory recording medium. The magnetic record device may be a hard disk device (HDD) etc. The optical disk may be a digital versatile disc (DVD), DVD-RAM, compact disc read only memory (CD-ROM), CD-R (recordable)/RW (rewritable), etc. The magneto optical recording medium may be a magneto optical disk (MO) etc. The storage unit 2102 is also included in a non-transitory recording medium. The recording medium and the recording medium read device are not essential devices An input/output unit such as a computer etc. is connected to the input/output interface which receives the information input by a user, and transmits the information to the control unit 2101 or the storage unit 2102 etc. through a bus. An input device of the input/output unit may be, for example, a keyboard, a pointing device (mouse etc.), a touch panel, etc. A display as an output unit of the input/output unit may be, for example, a liquid crystal display etc. An output unit may be an output device such as a cathode ray tube (CRT) display, a printer, etc.

Various processing functions may be realized according to the third embodiment using a computer having a hardware configuration described above. In this case, a program describing the process contents of the functions of the computer is provided. By executing the program by the computer, the processing functions are realized on the computer. The program describing the process contents may be recorded on a computer-readable recording medium.

When the program is circulated, for example, a recording medium such as a DVD, CD-ROM, etc. is put on sale. Furthermore, the program is recorded on a storage device of a service computer, and the program may be forwarded from the service computer to another computer.

The computer which executes the program records on the storage unit 2102 of the computer the program forwarded from the program recorded on a recording medium or the server computer. Then, the computer reads the program from the storage unit 2102 of the computer, and performs a process according to the program.

The control unit 2101 controls each unit of the external device 2100. Furthermore, the control unit 2101 acquires from each of the equipment devices 2a and 2b the identification information for identification of the equipment devices 2a and 2b, and the information about the charging power associated with each of the equipment devices 2a and 2b. Using each piece of acquired identification information, the control unit 2101 generates variable information that the combination of equipment devices 2a and 2b, the resonance frequency or the Q value of a resonance circuit of a power receiving unit of each of the equipment devices 2a and 2b associated with the combination are varied. The control unit 2101 refers to the combination of one or more equipment devices 2a and 2b, and combination information having the variable information about each of the equipment devices 2a and 2b associated with each of the combination of one or more equipment devices 2a and 2b, and selects the variable information associated with each of the equipment devices 2a and 2b using each piece of acquired identification information. The control unit 2101 transmits the variable information to each of the equipment devices 2a and 2b.

The control unit 2101 obtains the transmitting power using the charging power and efficiency corresponding to the equipment devices 2a and 2b, and transmits the information about the transmitting power to the power transmitting device 1. The charging power and the efficiency corresponding to he equipment devices 2a and 2b are transmitted from the external device 2100, and the transmitting power may be obtained by the power transmitting device 1. The transmitting power may be obtained by, for example, referring to each efficiency associated with the identification information using each piece of acquired identification information, acquiring the charging power and efficiency corresponding to each equipment device, and using the acquired charging power and efficiency. However, the method of obtaining the transmitting power is not limited to the method described above.

Described above is an operation of an external device.

Figure 22:
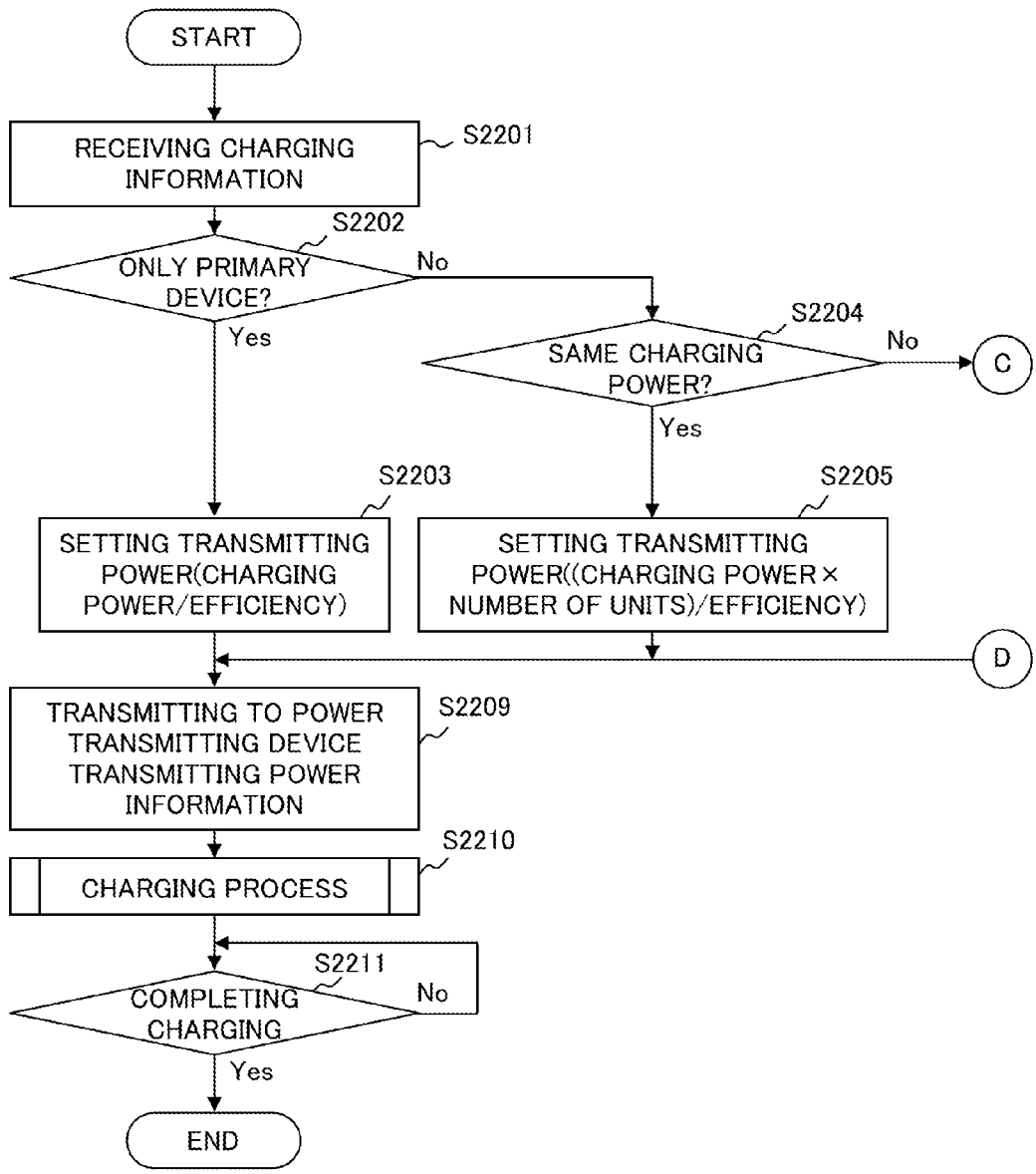
FIG. 22 is a flowchart of an embodiment of an operation of an external device.
Figure 23:
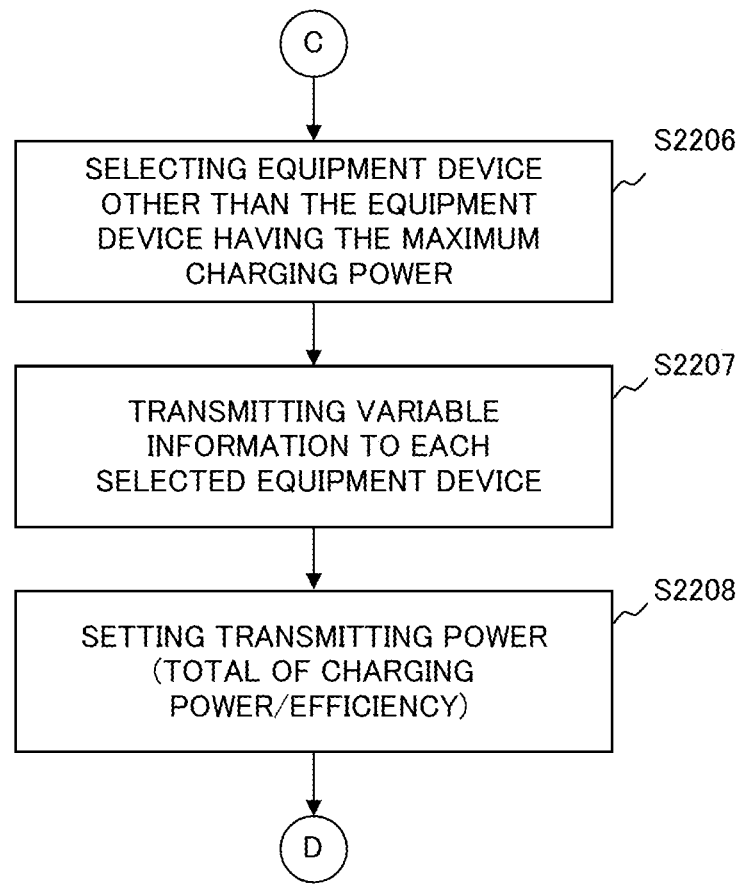
FIG. 23 is a flowchart of an embodiment of an operation of an external device.

FIGS. 22 and 23 are flowcharts of an embodiment of an operation of an external device. In step S2201, the control unit 2101 of the external device 2100 acquires the charging information transmitted by a wireless communication etc. from the equipment devices 2a and 2b. The communication unit 2103 forwards the charging information about the equipment devices 2a and 2b included in the received signal to the control unit 2101.

Then, in step S2201, the control unit 2101 stores the charging information received from the equipment devices 2a and 2b in the power reception information about the storage unit 2102. The power reception information includes the identification information for identification of an equipment device and the information about the charging power of each equipment device. Refer to FIGS. 7A-7C for the charging information and the power reception information.

If the control unit 2101 confirms that a signal including charging information is not transmitted from an equipment device for a specified period after the control unit 31a receives the signal including the charging information from the equipment device in step S2201, control is passed to step S2202. That is, the equipment device to be charged is confirmed. For example, when the equipment devices 2a and 2b are arranged in the power transmitting device 1, and if no new charging information is received after the lapse of a specified period after acquiring the charging information 71a and 71b, then control is passed to step S2202. Furthermore, when a signal including charging information is newly received in a specified period from the equipment device 2c, and if no new charging information is received after a specified period after a certain waiting period, then control is passed to step S2202. The determination of an equipment device to be charged is not limited to the method above, but another method may be used.

In step S2202, the control unit 2102 refers to the power reception information, and judges whether or not it is one equipment device that is arranged in the power transmitting device 1. If one equipment device is arranged (YES), control is passed to step S2203. If there are a plurality of equipment devices (NO), then control is passed to step S2204. For example, when the power reception information 72 in FIG. 7D is referred to, it is detected that three equipment devices, that is, the equipment devices 2a, 2b, and 2c, are arranged in the power transmitting device 1, there are equipment devices in addition to the primary equipment device, and control is passed to step S2204.

In step S2203, the control unit 2101 sets the transmitting power. The transmitting power is obtained using the charging power of the power reception information, and the equipment device of the efficiency information stored in the storage unit 2102. The transmitting power may be expressed by the equation 3.

The control unit 2101 refers to, for example, the power reception information 72, acquires "50" indicating 50 W as the charging information corresponding to the identification information "A", and refers to the efficiency information 73 and acquires "0.8" indicating 80% as the efficiency corresponding to the identification information "A". Then, the transmitting power 62.5 is obtained by calculating the charging power/efficiency.

In step S2204, the control unit 2101 refers to the power reception information, and judges whether or not the charging power of a plurality of equipment devices is the same, and the efficiency is the same. If they are the same (YES), control is passed to step S2205. If they are different (NO), control is passed to step S2206 in FIG. 23.

In step S2205, the control unit 2101 sets the transmitting power when the charging power of a plurality of equipment devices is the same, and the efficiency is also the same. The transmitting power when the charging power of a plurality of equipment devices is the same is obtained using the charging power of the power reception information, the number (unit) of the equipment devices to be charged, and the efficiency of the efficiency information stored in the storage unit 2102. The transmitting power may be expressed by the equipment device 4.

For example, if the number of equipment devices to be charged and stored in the power reception information is 30, and the charging power corresponding to each equipment device is all 5 W, and the efficiency is all 0.8 (80%), then the transmitting power of 18.75 W is obtained by the equation 4.

In step S2206 in FIG. 23, the control unit 2101 refers to the power reception information, and selects an equipment device other than the equipment device having the maximum charging power. For example, the control unit 2101 refers to the "CHARGING INFORMATION" about the power reception information 72 and selects an equipment device other than the equipment device having the maximum charging power. In the present embodiment, since an equipment device having the maximum charging power is an equipment device whose identification information is "A", the equipment device whose identification information is "B" and "C" is selected.

In step S2207 in FIG. 23, the control unit 2101 transmits a notification of varying the resonance frequency or the Q value of the power receiving unit of each selected equipment device other than a primary equipment device to each of the selected equipment devices. In step S2207, the control unit 2101 refers to the combination information using the received identification information, and acquires the variable information corresponding to the combination of simultaneously charged equipment devices.

Described below is the case in which, for example, the equipment device A having the primary charging power of 50 W, the equipment device B having the charging power of 5 W, and the equipment device C having the charging power of 3 W are simultaneously charged in step S2207. The control unit 31a refers to the combination information 81 in FIG. 8 using the power reception information 72 in FIG. 7D, and acquires the variable information "CA", "CB4", and "CC4" associated with "A", "B", and "C" of "COMBINATION OF EQUIPMENT DEVICES". Then, generated are a notification including the variable information "CA" to be notified to the equipment device A and the identification information for identification of the equipment device A, a notification including the variable information "CB4" notified to the equipment device B and the identification information for identification of the equipment device B, and a notification including the variable information "CC4" notified to the equipment device C and the identification information for identification of the equipment device C. Then, the notifications generated through the communication unit 2103 and the antenna 2104 are transmitted to the equipment devices A, B, and C.

In step S2208 in FIG. 23, the control unit 2101 sets the transmitting power when the charging power of a plurality of equipment devices is different or the efficiency is different. The transmitting power when the charging power of a plurality of equipment devices is different or when the efficiency is different is obtained using the charging power of the power reception information and the efficiency corresponding to each equipment device of the combination information stored in the storage unit 2102. The transmitting power may be expressed by the equation 5.

In step S2209, the control unit 2101 transmits the transmitting power information to the power transmitting device 1 through a communication unit 2103. The control unit 2101 transmits the transmitting power information to the power transmitting device 1 through the communication unit 2103.

In step S2210, the control unit 2101 performs a charging process. For example, when the control unit 2101 detects the completion of changing the Q value, control is passed to the charging start state. The charging start state may be notified to the power transmitting device 1.

In step S2211, the control unit 2101 detects the completion of charging. Upon detection of the completion of the charging, the control unit 2101 terminates the charging process (YES). When the control unit 2101 does not detect the completion of the charging (NO), it continues the charging. The completion of the charging is performed by, for example, measuring the output voltage of a battery, and when a value not less than a threshold is detected, the charging is completed. The completion of the charging may be notified to the power transmitting device 1, and the power transmitting device 1 may terminate the charging.

Described below is the operation of the equipment device according to the third embodiment.

Figure 24:
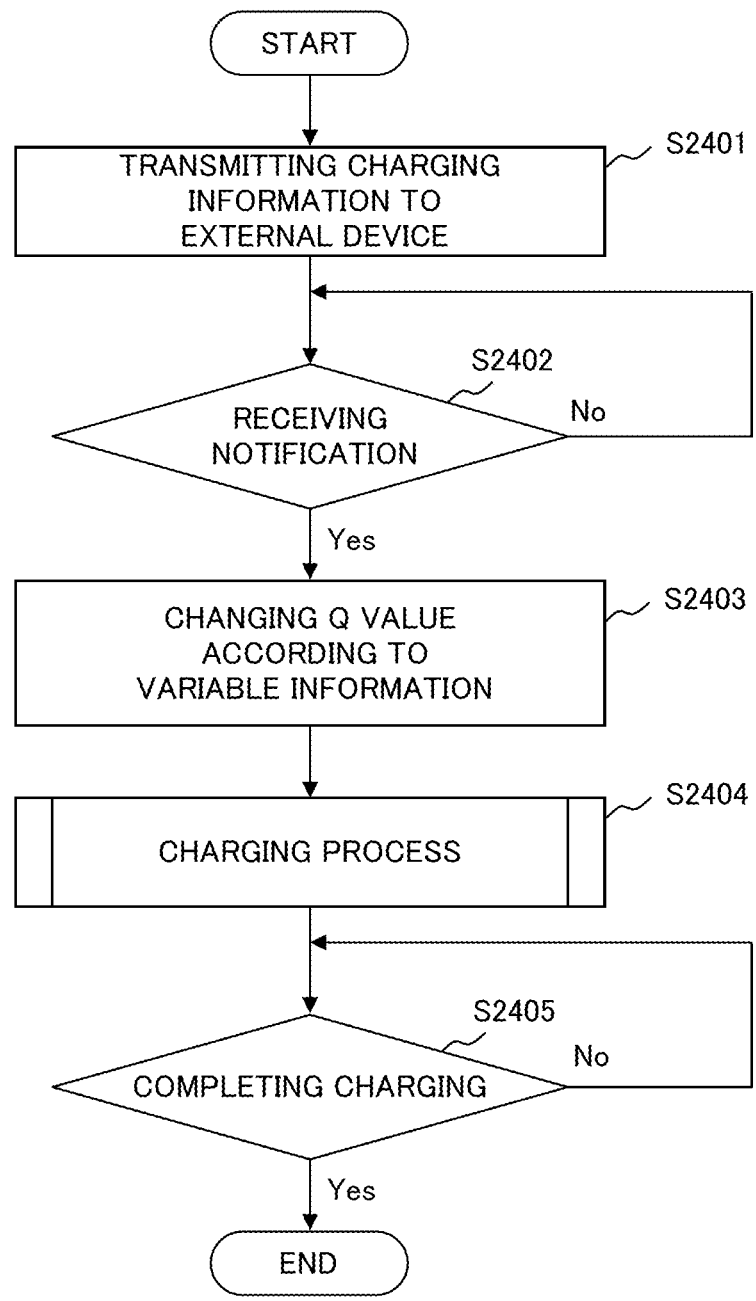
FIG. 24 is a flowchart of an embodiment of an operation of an equipment device according to the third embodiment.

FIG. 24 is a flowchart of an embodiment of an operation of an equipment device according to the third embodiment. In the third embodiment, the control unit transmits the charging information to an external device in step S2401. The control unit 31*a* acquires, for example, an identification number assigned to each equipment device stored in the storage unit 32*a* and the charging power for each equipment device, and generates charging information. Then, the control unit 31*a* forwards the charging information to the communication unit 33*a*, and transmits the information to the external device 2100 through the antenna 34*a*.

In step S2402, after transmitting the charging information to the external device 2100, the control unit of the equipment device judges whether or not a notification transmitted from the external device 2100 has been received. If the notification has been transmitted (YES), then control is passed to step S2403. Unless the notification has been transmitted (NO), then the process enters a standby state. It is judged that the notification has been received if the identification information included in the received notification is the same as the equipment device which has received the notification.

In step S2403, the control unit of the equipment device changes the Q value by referring to the Q value variable information stored in the storage unit of the equipment device using the variable information included in the notification received by the control unit.

In step S2404, when the control unit of the equipment device detects that the change of the Q value has been completed, the unit performs the charging process. The charging start state may be notified to the power transmitting device 1.

In step S2405, the control unit of the equipment device detects the completion of charging. Upon detection of the completion of the charging, the control unit terminates the charging process (YES). When the control unit 31*a* does not detect the completion of the charging (NO), it continues the charging. The completion of the charging is performed by, for example, measuring the output voltage of a battery, and when a value not less than a threshold is detected, the charging is completed. The completion of the charging may be notified to the power transmitting device 1 through the external device 2100, thereby terminating the charging.

Described below is the operation of the power transmitting device according to the third embodiment.

Figure 25:
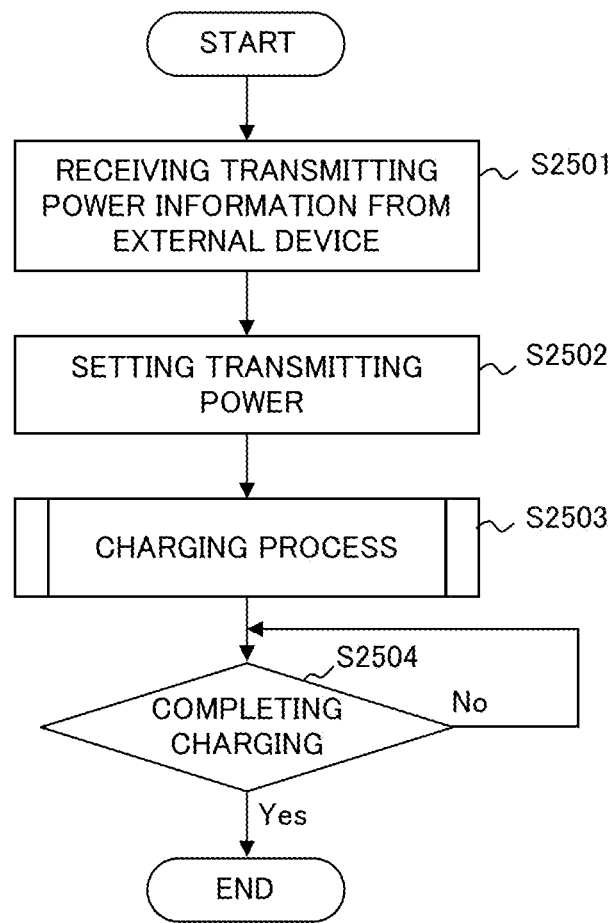
FIG. 25 is a flowchart of an embodiment of an operation of a power transmitting device according to the third embodiment.

FIG. 25 is a flowchart of an embodiment of an operation of a power transmitting device according to the third embodiment. In step S2501, the control unit 21 of the power transmitting device 1 in FIG. 21 receives the transmitting power information from the external device 2100.

In step S2502, the control unit 21 makes a setting so that the electric power indicated by the transmitting power information may be transmitted from the power supply unit 25 and the power transmitting unit 26.

In step S2503, upon detection of the completion of the preparation for power transmission, the control unit 21 performs the charging process. The state of the charging process may be notified to the equipment device 2*a*.

In step S2504, the control unit 21 detects the completion of the charging. Upon detection of the charging, the control unit 21 terminates (YES) the process after completing the charging. When the completion of the charging is not detected (NO), the charging is continued.

According to the third embodiment, appropriate electric power may be supplied to an equipment device requiring different charging power although electric power is to be simultaneously supplied to a plurality of equipment devices requiring different charging power.

Furthermore, since the electric power balance may be adjusted, a plurality of equipment devices requiring different charging power may be simultaneously charged. In addition, the loss at the power transmission may be minimized.

According to the third embodiment, a resonance frequency or a Q value may be adjusted depending on the electric power balance for a combination.

Additionally, the resonance frequency or the Q value may be adjusted depending on the power balance by considering the charging state of a battery and the power distribution on the charging table according to the third embodiment.

Described below is the fourth embodiment.

Figure 26B:
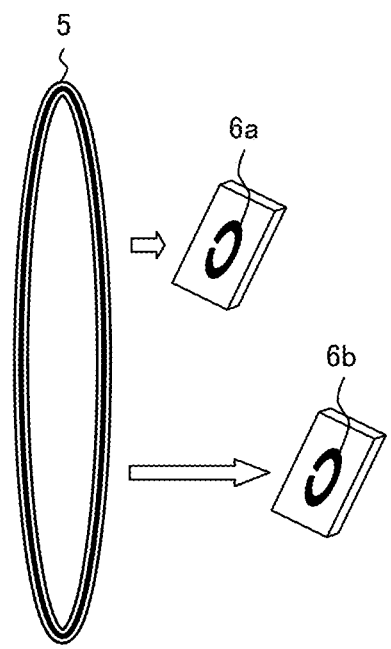
Figure 26C:
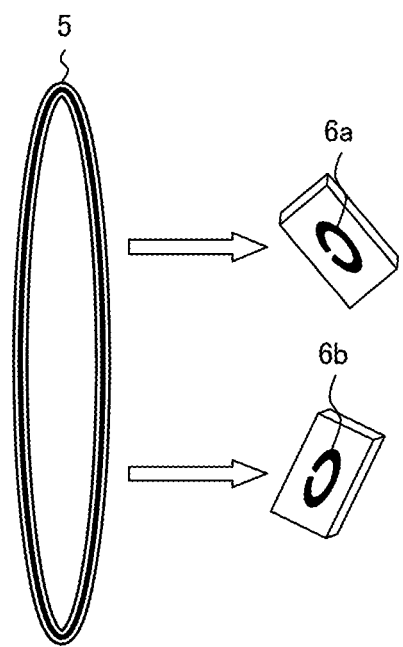
Figure 27C:
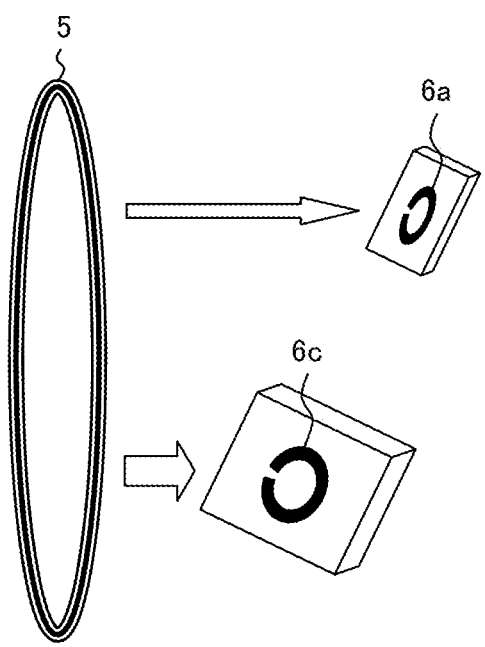

FIGS. 26 and 27 illustrate the positional relationship between a power transmission resonance coil and a power reception resonance coil. The power reception resonance coils 6*a* and 6*b* illustrated in FIGS. 26 and 27 are the same coils, and the efficiency of each equipment device including the power reception resonance coils 6*a* and 6*b* is the same. The power reception resonance coil 6*c* illustrated in FIGS. 27A-27C are different from the power reception resonance coils 6*a* and 6*b*, and efficiency of each equipment device provided with the power reception resonance coil 6*c* is also different from that of the power reception resonance coils 6*a* and 6*b*.

In 26A in FIG. 26A, the power reception resonance coils 6*a* and 6*b* are placed at equal distance with respect to the power transmission resonance coil 5, and adopt the same postures.

In 26B in FIG. 26B, the postures of the power reception resonance coils 6a and 6b are the same, but are placed at different distances with respect to the power transmission resonance coil 5. 26C in FIG. 26C indicates different distances and postures of the power reception resonance coils 6a and 6b with respect to the power transmission resonance coil 5. Since the efficiency changes if the distances or the postures of the power reception resonance coils 6a and 6b are different with respect to the power transmission resonance coil 5, the resonance frequency or the Q value are to be adjusted and the transmitting power is to be obtained with the change of the efficiency taken into account.

In 27A in FIG. 27A, the power reception resonance coils 6a and 6c are at equal distances with respect to the power transmission resonance coil 5, and the postures are the same. In 27B in FIG. 27B, the power reception resonance coil 6a is closer to the power transmission resonance coil 5 than the power reception resonance coil 6c, and the postures of the power reception resonance coils 6a and 6c are the same. In 27C in FIG. 27C, the power reception resonance coil 6a is closer to the power transmission resonance coil 5 than the power reception resonance coil 6c, and the postures of the power reception resonance coils 6a and 6c are the same. If the distances or the postures of the power reception resonance coils 6a and 6c are different, then the efficiency changes. Therefore, even in the case illustrated in FIGS. 27A-27C, the resonance frequency of the equipment device or the Q value are to be adjusted and the transmitting power is to be obtained with the change of the efficiency taken into account.

Then, in the fourth embodiment, appropriate electric power may be supplied to the equipment device with the efficiency taken into account although the efficiency changes by the positional relationship between the power transmitting device and the equipment device.

Figure 28:
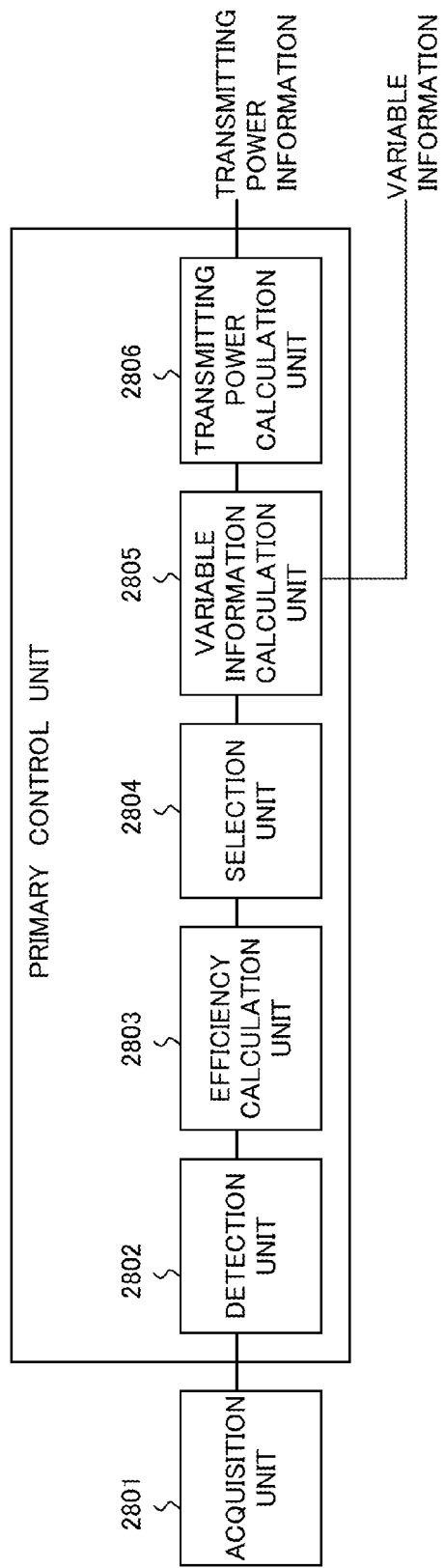
FIG. 28 illustrates an embodiment of a primary control unit according to the fourth embodiment.

FIG. 28 illustrates an embodiment of a primary control unit according to the fourth embodiment. FIG. 29 illustrates an embodiment of the data structure of state-efficiency information according to the fourth embodiment. FIG. 30 illustrates an embodiment of the data structure of combination information according to the fourth embodiment.

An acquisition unit 2801 acquires the information to be used in obtaining the positional relationship between a power transmitting device and an equipment device. An acquisition unit may be, for example, an image pickup device. The information to be used in obtaining the positional relationship may be the information about the image information captured by an image pickup device, and the information about the positional relationship measured by a sensor. However, the information to be used in obtaining the positional relationship is not limited to the image data, but may be any data indicating the positional relationship.

A detection unit 2802, an efficiency calculation unit 2803, a selection unit 2804, a variable information calculation unit 2805, and a transmitting power calculation unit 2806 illustrated in FIG. 28 are provided for the control unit of the primary device. That is, they may be provided for any of the power transmitting device 1, the equipment device, and the external device.

The detection unit 2802 acquires the information used in obtaining the positional relationship, and obtains the state information about the positional relationship between the power transmitting device and the equipment device. The state information may be, for example, the information about the position and the posture of the equipment device in a 3-dimensional space. The position of the equipment device provided with a specific marker is shot by the image pickup device, the equipment device is recognized by analyzing the information about the shot image by image processing etc, and the position of the equipment device in the 3-dimensional space is estimated from the depth (distance) and the vision from the position in which the recognized equipment device has been shot. The posture is estimated using the marker provided for the recognized equipment device and a contour image.

The efficiency calculation unit 2803 obtains the efficiency information about the efficiency from the obtained state information. For example, the information is obtained using state-efficiency information 2901 in FIG. 29. The state-efficiency information 2901 refers to the information stored in "ID", "STATE INFORMATION", and "EFFICIENCY INFORMATION". "ID" stores the information for identification of an equipment device. In the present embodiment, "A", "B", . . . are stored as the information for identification.

"STATE INFORMATION" stores, for example, the position information about the position of an equipment device in the 3-dimensional space. In the present embodiment, the position information stores the information "LA1", "LA2", . . . , "LB1", "LB2", . . . etc. about the position. The posture information stores the information "RA1", "RA2", . . . , "RB1", "RB2", . . . , etc. about the posture as associated with the information stored in "ID" and "POSITION INFORMATION".

"EFFICIENCY INFORMATION" stores the efficiency obtained from the positional relationship between the power transmitting device and the equipment device. In the present embodiment, as the information about the efficiency, "EA11", "EA12", . . . , "EA21", "EA22", . . . "EB11", "EB12", . . . "EB21", "EB22b", . . . etc. are stored as associated with the information stored in "ID", "STATE INFORMATION", etc. The stored efficiency information may be obtained by an experiment, a simulation, etc.

The selection unit 2804 obtains the second charging information using the first charging information and the efficiency information acquired from each equipment device. The first charging information is the charging information about each equipment device stored in the power reception information 72 in FIG. 7D. The efficiency information is the efficiency information based on the positional relationship obtained by the efficiency calculation unit 2803. The second charging information may be expressed by, for example, first charging power/unit efficiency=50 W (=5/0.1) when the first charging power (electric power requested by the equipment device) acquired from the equipment device is 5 W and the efficiency information (unit efficiency) based on the positional relationship is 10%.

Furthermore, when the first charging power is 20 W, and the unit efficiency is 80%, the second charging information may be expressed by the first charging power/unit efficiency=25 W (=20/0.8).

Then, the selection unit 2804 selects an equipment device other than the equipment device corresponding to the largest second charging information in the obtained second charging information.

The variable information calculation unit 2805 obtains the variable information from the combination of the efficiency information about the equipment device selected by the selection unit 2804. For example, the variable information may be obtained using combination information 3001 in FIG. 30. The combination information 3001 includes the information stored in "COMBINATION" and "VARIABLE INFORMATION".

"COMBINATION" stores the combination of efficiency of each equipment device. In the present embodiment, the combination of the efficiency of a different equipment device corresponding to the identification information "A", "B", .... The combination of the efficiency of an equipment device is described below. When the efficiency of one equipment device A is "EA11", "COMBINATION" stores only "EA11". When two equipment devices A1 and A2 indicate the same efficiency "EA11", "COMBINATION" stores the efficiency "EA11", "EA11" of the equipment devices A1 and A2. The same holds true with the case in which two or more identical equipment devices indicate the same efficiency. Furthermore, when the efficiency of the equipment device A1 is "EA11" and the efficiency of the equipment device B1 is "EB11", "COMBINATION" stores the efficiency "EA11" and "EB11" of two equipment devices A1 and B1. The same holds true with other combinations.

"VARIABLE INFORMATION" stores the information that the resonance frequency of each equipment device or the Q value are varied as associated with the information stored in "COMBINATION". In the present embodiment, the variable information "CA11" and "CA12" about the equipment devices A1 and A2, and the variable information "CB11", "CB12", . . . about the equipment devices B1 and B2 are stored. The values indicated by "CA11", "CA12", . . . are the valued used in setting the LC resonance circuit of the power receiving unit 35 of the equipment device corresponding to the identification information "A1", "A2", . . . . "CB11", "CB12", . . . are the values used in setting the LC resonance circuit of the power receiving unit 35 of the equipment device corresponding to the identification information "B1" and "B2".

The variable information calculation unit 2805 transmits to each of the selected equipment devices the notification including the variable information for varying the resonance frequency or the Q value of the power receiving unit 35 of each of the selected equipment devices.

Before starting the charging, it is assumed that the resonance frequency or the Q value of the power receiving unit 35 of the equipment device is set to the optimum value for charging the charging power of the first charging information. The optimum value is, for example, the value for the highest efficiency in charging electric power from the power transmitting device 1 to the equipment device.

The transmitting power calculation unit 2806 obtains the transmitting power using the second charging power of all equipment devices transmitted from the power transmitting device 1.

Described below is the operation of a primary control unit according to the fourth embodiment.

FIG. 31 illustrates an embodiment of an operation of a primary control unit according to the fourth embodiment. In step S3101 in FIG. 31, a primary control unit acquires the first charging information about each equipment device. When the power transmitting device 1 is a primary device, the first charging information about each equipment device is acquired in step S3101 as with step S1. If the equipment device is the primary device, for example, when the equipment device 2a in FIG. 16 is a primary device, the second charging information about each equipment device is acquired in step S3101 as with step S1701. When the external device 2100 is a primary device, the first charging information about each equipment device is acquired in step S3101 as with step S2201.

In step S3102, the primary control unit obtains the state information about each equipment device.

When the power transmitting device 1 is a primary device, for example, the control unit 21 of the power transmitting device 1 acquires the information used in obtaining the positional relationship between the power transmitting device 1 and each equipment device from the acquisition unit 2801 provided for the power transmitting device 1, and obtains the state information about the positional relationship between the power transmitting device and the equipment device.

When the equipment device is a primary device, for example, the control unit 31a of the equipment device 2a in FIG. 16 acquires the information used in obtaining the positional relationship between the power transmitting device 1 and the equipment device from the acquisition unit 2801 provided for the power transmitting device 1, and obtains the state information about the positional relationship between the power transmitting device and the equipment device. Furthermore, the acquisition unit 2801 may be provided for each equipment device, and each equipment device may acquire the information used in obtaining the positional relationship between the power transmitting device 1 and the equipment device, thereby collecting each piece of information acquired by the control unit 31a of the equipment device 2a.

When the external device 2100 is a primary device, for example, the control unit 2101 in FIG. 21 acquires the information used in obtaining the positional relationship between the power transmitting device power transmitting device 1 and the equipment device from the acquisition unit 2801 provided for the power transmitting device 1, thereby obtaining the state information about the positional relationship between the power transmitting device and the equipment device. Furthermore, the acquisition unit 2801 may be provided for each equipment device, and each equipment device may acquire the information used in obtaining the positional relationship between the power transmitting device 1 and the equipment device, thereby collecting each piece of information acquired by the control unit 2101 of the external device 2100.

In step S3103, a primary control unit estimates the efficiency information about each equipment device is estimated using each piece of state information.

When the power transmitting device 1 is a primary device, for example, the efficiency calculation unit 2803 of the control unit 21 of the power transmitting device 1 in FIG. 15 acquires the state information from the detection unit 2802 of the control unit 21, and estimates the efficiency information about each equipment device. For example, the information may be of using the state-efficiency information 2901 stored in the storage unit 22.

When the equipment device is a primary device, for example, the efficiency calculation unit 2803 of the control unit 31a of the equipment device 2a in FIG. 16 acquires the state information from the detection unit 2802 of the control unit 31a, and estimates the efficiency information about each equipment device. For example, the information may be obtained using the state-efficiency information 2901 stored in the storage unit 32a.

When the external device 2100 is a primary device, for example, the efficiency calculation unit 2803 of the control unit 2101 in FIG. 21 acquires the state information from the detection unit 2802 of the control unit 2101, and estimates the efficiency information about each equipment device. For example, the information may be obtained using the state-efficiency information 2901 stored in the storage unit 2102.

In step S3104, the primary control unit selects an equipment device other than the equipment device of the largest second charging power.

When the power transmitting device 1 is a primary device, for example, the selection unit 2804 of the control unit 21 of the power transmitting device 1 in FIG. 15 obtains the second charging information using the first charging information and the efficiency information acquired from each equipment device.

When the equipment device is a primary device, for example, the selection unit 2804 of the control unit 31a of the equipment device 2a in FIG. 16 obtains the second charging information using the first charging information and the efficiency information acquired from each equipment device.

When the external device 2100 is a primary device, for example, the selection unit 2804 of the control unit 2101 in FIG. 21 obtains the second charging information using the first charging information and the efficiency information acquired from each equipment device.

In step S3105, the primary control unit obtains the variable information using the combination of a selected equipment device (equipment device other than the equipment device having the largest second charging power) and the efficiency information about the selected equipment device.

When the power transmitting device 1 is a primary device, for example, the variable information calculation unit 2805 of the control unit 21 of the power transmitting device 1 in FIG. 15 obtains the variable information from the combination of the efficiency information about the selected equipment device. For example, the information may be using the combination information 3001 in FIG. 30. For example, the information may be obtained using the combination information 3001 stored in the storage unit 22.

When the equipment device is a primary device, for example, the variable information calculation unit 2805 of the control unit 31a of the equipment device 2a in FIG. 16 obtains the variable information from the combination of the efficiency information about the selected equipment device. For example, the information may be obtained using the combination information 3001 stored in the storage unit 32a.

When the external device 2100 is a primary device, for example, the variable information calculation unit 2805 of the control unit 2101 in FIG. 21 obtains the variable information from the combination of the efficiency information about the selected equipment device. For example, the information may be obtained using the combination information 3001 stored in the control unit 2101.

In step S3106, the primary control unit transmits as variable information a notification that the resonance frequency or the Q value of the power receiving unit 35 is varied to each of the selected equipment devices. When the power transmitting device 1 is a primary device, the variable information is transmitted to the selected equipment device in step S3106 as in step S7. When the equipment device is a primary device, for example, when the equipment device 2a in FIG. 16 is a primary device, the variable information is transmitted to the selected equipment device in step S3106 as in step S1707. When the external device 2100 is a primary device, the charging information about each equipment device is acquired in step S3106 as in step S2207.

In step S3107, a primary control unit obtains the transmitting power.

When the power transmitting device 1 is a primary device, for example, the transmitting power calculation unit 2806 of the control unit 21 of the power transmitting device 1 in FIG. 15 obtains the transmitting power using the second charging power of all equipment devices transmitted from the power transmitting device 1.

When the equipment device is a primary device, for example, the equipment device 2a in FIG. 16 is a primary device, the transmitting power calculation unit 2806 of the control unit 31a obtains the transmitting power using the second charging power of all equipment devices transmitted from the power transmitting device 1.

When the external device 2100 is a primary device, the transmitting power calculation unit 2806 of the control unit 2101 obtains the transmitting power using the second charging power of all equipment devices transmitted from the power transmitting device 1.

In step S3108, the primary control unit transmits the transmitting power information to the power transmitting device 1. When the power transmitting device 1 is a primary device, the transmitting power information is transmitted to the power transmitting device 1 in step S3108, and the charging is started as described above in step S9. When the equipment device is a primary device, for example, when the equipment device 2a in FIG. 16 is a primary device, the transmitting power information is transmitted to the power transmitting device 1 in step S3108 as in step S1710. Then, the charging is started. When the external device 2100 is a primary device, the transmitting power information is transmitted to the power transmitting device 1 in step S3108 as in step S2209.

According to the fourth embodiment, although a plurality of equipment devices are simultaneously provided with electric power, appropriate electric power may be supplied to equipment devices requiring different charging power.

Furthermore, since the electric power balance may be adjusted, a plurality of equipment devices requiring different charging power may be simultaneously charged. Furthermore, the loss of transmitting power may be minimized.

In addition, according to the fourth embodiment, the resonance frequency or the Q value depending on the power balance based on the combination may be adjusted.

Furthermore, according to the fourth embodiment, the resonance frequency or the Q value depending on the power balance may be adjusted with the charging state of a battery or the power distribution on the charging table taken into account.

A variable example is described below.

Described below is the case in which the transmitting power is limited.

For example, described is the case in which the power that may be transmitted from the power transmitting device 1 is 50 W when the first charging power of the equipment device A is 5 W, the efficiency information is 0.1, the second charging power is 50 W, the first charging power of the equipment device B is 20 W, the efficiency information is 0.8, and the second charging power is 25 W. Since the second charging power of the equipment device A is 50 W and the second charging power of the equipment device B is 25 W, the total power is 75 W, which is deficient when the power transmitted from the power transmitting device 1 is 50 W. Then, the ratio of the first charging power 5 W of the equipment device A to the first charging power 20 W of the equipment device B is 1:4, the transmitting power of 50 W is divided using the ratio, and the second charging power of the equipment devices A and B are obtained. The second charging power of the equipment device A is 31.25 W, and the second charging power of the equipment device B is 18.75 W. That is, the second charging power of each equipment device is obtained by dividing the transmitting power by using the ratio of the first charging power of each equipment device. And the variable information and the transmitting power are obtained using the obtained second charging power of each equipment device.

According to a variable example, appropriate electric power may be supplied to equipment devices requiring different charging power although the transmitting power is limited.

Detailed Explanation of LC Resonance Circuit

Figure 32:
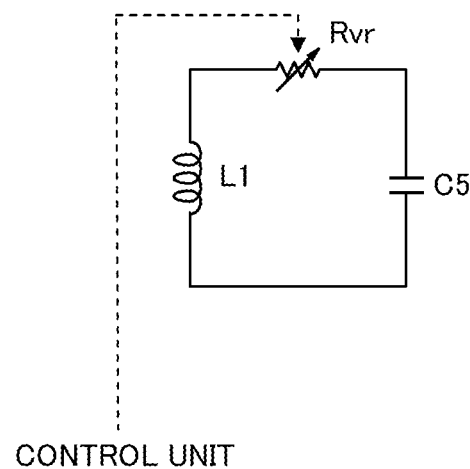
FIG. 32 illustrates an embodiment of a resonance circuit.

FIG. 32 illustrates an embodiment of a resonance circuit. In the circuit illustrated in FIG. 32, the balance of power transfer is adjusted by variable resonance frequency. That is, a variable resistor Rvr is provided for the LC resonance circuit of the power receiving unit 35 in FIG. 3 and the power receiving units 35a and 35b in FIGS. 15, 16, and 17, and the resonance frequency is varied by varying the impedance, thereby adjusting the balance of the transfer of electric power. The variable resistor Rvr may be provided for the LC resonance circuit illustrated in FIGS. 4 and 5.

An LC resonance circuit 3201 illustrated in FIG. 32 includes the coil L1, the condenser C5, and the variable resistor Rvr, varies the impedance, and adjusts the resonance frequency. The coil L1, the variable resistor Rvr, and the condenser C5 are connected in series. Furthermore, the four circuits connected in series are connected in parallel. The variable resistor Rvr may adjust the resonance frequency or the Q value under the control of the control unit 31 and in FIG. 3, and the control units 31a and 31b in FIGS. 15, 16, and 17.

When the LC resonance circuit having the variable resistor Rvr is applied to the first through fourth embodiments, the information for changing the variable resistor Rvr of the LC resonance circuit is added to the variable information.

Furthermore, the present invention is not limited to the first, second, third, and fourth embodiments and the variable examples, but may be improved or changed within the scope of the gist of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. A power transmitting device, comprising:
a power transmitting unit which transmits electric power at a power transmitting frequency using magnetic field resonance or electric field resonance to each of a plurality of equipment devices including a non-contact power receiving unit;
a control unit which obtains change information for making a resonance frequency value of a resonance circuit of the power receiving unit of an equipment device having maximum charging power from among the plurality of equipment devices equal to a value of the power transmitting frequency, and for making a resonance frequency value or a Q value of a resonance circuit of the power receiving unit of each of other equipment devices other than the equipment device having the maximum charging power equal to a value for achieving a power receiving amount that depends on charging power of each of the other equipment devices;
a power supply unit which provides the power transmitting unit with electric power to be transmitted to the plurality of equipment devices; and
a communication unit which transmits to each of the plurality of equipment devices the change information corresponding to each of the plurality of equipment devices.

2. The device according to claim 1, wherein
the control unit
acquires from each of the plurality of equipment devices identification information for identification of each of the plurality of equipment devices and charging power information indicating charging power related to each of the plurality of equipment devices, and
refers to combination information associating a combination of two or more equipment devices included in the plurality of equipment devices with the change information related to each of equipment devices belonging to the combination, and obtains the change information related to each of the plurality of equipment devices from the combination information using the identification information related to each of the plurality of equipment devices that is acquired from each of the plurality of equipment devices.

3. The device according to claim 1, wherein
the control unit
acquires from each of the plurality of equipment devices identification information for identification of each of the plurality of equipment devices and charging power information indicating charging power related to each of the plurality of equipment devices,
obtains second charging power related to each of the plurality of equipment devices using the charging power information related to each of the plurality of equipment devices and efficiency information indicating power charging efficiency between the power transmitting device and each of the plurality of equipment devices,
selects, as the other equipment devices, equipment devices other than the equipment device having the maximum second charging power from among the plurality of equipment devices, and
obtains the change information for making a resonance frequency value or a Q value of a resonance circuit of a power receiving unit of each of the other equipment devices selected as a result of the selecting equal to a value for achieving a power receiving amount that depends on charging power of each of the other equipment devices.

4. The device according to claim 3, wherein
state information indicating a positional relationship between the power transmitting device and each of the plurality of equipment devices is used as the efficiency information.

5. The device according to claim 4, wherein
the control unit obtains electric power to be transmitted by the power transmitting unit using the charging power information related to each of the plurality of equipment devices and efficiency information indicating charging power efficiency between the power transmitting unit and each of the plurality of equipment devices.

6. The device according to claim 1, wherein
the change information
is information related to a capacitance of a resonance circuit of a power receiving unit of each of the plurality of equipment devices when the power transmitting unit transmits electric power using the magnetic field resonance, and
is information related to an inductance of a resonance circuit of a power receiving unit of each of the plurality of equipment devices when the power transmitting unit transmits electric power using the electric field resonance.

7. The device according to claim 1, wherein
the change information changes a capacitance, an inductance, or an impedance of a resonance circuit of a power receiving unit of each equipment device.

8. A power receiving device of an equipment device, the power receiving device comprising:
a power receiving unit which includes a resonance circuit and which receives electric power from a power transmitting device which includes a non-contact power transmitting unit and which transmits electric power at a power transmitting frequency using magnetic field resonance or electric field resonance to each of a plurality of equipment devices; and
a control unit which
generates charging information which includes identification information for identification of the equipment device which includes the power receiving device and charging power information indicating charging power associated with the equipment device which includes the power receiving device, the charging information being information to be transmitted from the equipment device which includes the power receiving device to the power transmitting device,
receives from the power transmitting device change information related to a resonance frequency value or a Q value of the resonance circuit of the power receiving unit, and
controls a resonance frequency value or a Q value of the resonance circuit of the power receiving unit according to the change information, wherein
when the equipment device which includes the power receiving device has maximum charging power from among the plurality of equipment devices, the change information makes the resonance frequency value of the resonance circuit of the power receiving unit equal to a value of the power transmitting frequency; otherwise, the change information makes the resonance frequency value or the Q value of the resonance circuit of the power receiving unit equal to a value for achieving a power receiving amount that depends on charging power of the equipment device which includes the power receiving device.

9. The device according to claim 8, further comprising
a communication unit which communicates with the power transmitting device and the equipment device, wherein
the control unit
obtains change information for making a resonance frequency value of a resonance circuit of a power receiving unit of an equipment device having maximum charging power from among the plurality of equipment devices equal to a value of the power transmitting frequency, and for making a resonance frequency value or a Q value of a resonance circuit of the power receiving unit of each of other equipment devices other than the equipment device having the maximum charging power equal to a value for achieving a power receiving amount that depends on charging power of each of the other equipment devices, and
causes the communication unit to transmit to each of the plurality of equipment devices the obtained change information corresponding to each of the plurality of equipment devices.

10. The device according to claim 9, wherein
the control unit
acquires from each of the plurality of equipment devices identification information for identification of each of the plurality of equipment devices and charging power information indicating charging power related to each of the plurality of equipment devices, and
refers to combination information associating a combination of two or more equipment devices included in the plurality of equipment devices with the change information related to each of equipment devices belonging to the combination, and obtains the change information related to each of the plurality of equipment devices from the combination information using the identification information related to each of the plurality of equipment devices that is acquired from each of the plurality of equipment devices.

11. The device according to claim 9, wherein
the control unit
acquires from each of the plurality of equipment devices identification information for identification of each of the plurality of equipment devices and charging power information indicating charging power related to each of the plurality of equipment devices,
obtains second charging power related to each of the plurality of equipment devices using the charging power information related to each of the plurality of equipment devices and efficiency information indicating power charging efficiency between the power transmitting device and the plurality of equipment devices,
selects, as the other equipment devices, equipment devices other than the equipment device having the maximum second charging power from among the plurality of equipment devices, and
obtains the change information for making a resonance frequency value or a Q value of a resonance circuit of a power receiving unit of each of the other equipment devices selected as a result of the selecting equal to a value for achieving a power receiving amount that depends on charging power of each of the other equipment devices.

12. The device according to claim 11, wherein
state information indicating a positional relationship between the power transmitting device and each of the plurality of equipment devices is used as the efficiency information.

13. The device according to claim 9, wherein
the control unit causes the communication unit to transmit to the power transmitting device the charging power information related to each of the plurality of equipment devices and efficiency information indicating power charging efficiency between the power transmitting device and each of the plurality of equipment devices, or
to transmit to the power transmitting device information indicating electric power which is to be transmitted by the power transmitting unit and obtained using the charging power information and the efficiency information.

14. The device according to claim 8, wherein:
the resonance circuit is an LC resonance circuit;
the change information is information related to capacitance of the resonance circuit when the power transmitting unit transmits electric power using the magnetic field resonance; and
the change information is information related to inductance of the resonance circuit when the power transmitting unit transmits electric power using the electric field resonance.

15. The device according to claim 8, wherein:
the resonance circuit is an LC resonance circuit; and
the change information is information related to capacitance, inductance, or impedance of the LC resonance circuit.

16. An external device, comprising:
a communication unit which communicates with each of a plurality of equipment devices including a non-contact power receiving unit, and which also communicates with a power transmitting device provided with a power transmitting unit which transmits electric power at a power transmitting frequency using magnetic field resonance or electric field resonance to each of the plurality of equipment devices; and
a control unit which
  obtains change information for making a resonance frequency value of a resonance circuit of the power receiving unit of an equipment device having maximum charging power from among the plurality of equipment devices equal to a value of the power transmitting frequency, and for making a resonance frequency value or a Q value of a resonance circuit of the power receiving unit of each of other equipment devices other than the equipment device having the maximum charging power equal to a value for achieving a power receiving amount that depends on charging power of each of the other equipment devices,
  causes the communication unit to transmit to each of the plurality of equipment devices the change information corresponding to each of the plurality of equipment devices, and
  causes the communication unit to transmit to the power transmitting device charging power information indicating charging power related to each of the plurality of equipment devices and efficiency information indicating power charging efficiency between the power transmitting device and each of the plurality of equipment devices, or to transmit to the power transmitting device information indicating electric power which is to be transmitted by the power transmitting unit and obtained using the charging power information and the efficiency information.

17. The device according to claim 16, wherein
the control unit
  acquires from each of the plurality of equipment devices identification information for identification of each of the plurality of equipment devices and the charging power information related to each of the plurality of equipment devices, and
  refers to combination information associating a combination of two or more equipment devices included in the plurality of equipment devices with the change information related to each of equipment devices belonging to the combination, and obtains the change information related to each of the plurality of equipment devices from the combination information using the identification information related to each of the plurality of equipment devices that is acquired from each of the plurality of equipment devices.

18. The device according to claim 16, wherein
the control unit
  acquires from each of the plurality of equipment devices identification information for identification of each of the plurality of equipment devices and the charging power information related to each of the plurality of equipment devices,
  obtains second charging power related to each of the plurality of equipment devices using the charging power information related to each of the plurality of equipment devices and the efficiency information indicating power charging efficiency between the power transmitting device and each of the plurality of equipment devices;
  selects, as the other equipment devices, equipment devices other than the equipment device having the maximum second charging power from among the plurality of equipment devices, and
  obtains the change information for making a resonance frequency value or a Q value of a resonance circuit of a power receiving unit of each of the other equipment devices selected as a result of the selecting equal to a value for achieving a power receiving amount that depends on charging power of each of the other equipment devices.

19. The device according to claim 18, wherein
state information indicating a positional relationship between the power transmitting device and each of the plurality of equipment devices is used as the efficiency information.

20. A non-contact charging method for charging each of a plurality of equipment devices each including a power receiving device provided with a power receiving unit by transmitting electric power from a power transmitting device including a non-contact power transmitting unit to each of the plurality of equipment devices at a power transmitting frequency using magnetic field resonance or electric field resonance, wherein:
  each of the plurality of equipment devices
    transmits to the power transmitting device charging information that includes identification information for identification of each of the plurality of equipment devices and charging power information indicating charging power related to each of the plurality of equipment devices,
  the power transmitting device
    receives the charging information from each of the plurality of equipment devices,
    obtains change information for making a resonance frequency value of a resonance circuit of the power receiving unit of the power receiving device of an equipment device having maximum charging power from among the plurality of equipment devices equal to a value of the power transmitting frequency, and for making a resonance frequency value or a Q value of a resonance circuit of the power receiving unit of the power receiving device of each of other equipment devices other than the equipment device having the maximum charging power equal to a value for achieving a power receiving amount that depends on charging power of each of the other equipment devices, and
    obtains transmitting power to be transmitted by the power transmitting unit using the charging power information related to each of the plurality of the equipment devices and efficiency information indicating charging power efficiency between the power transmitting device and each of the plurality of equipment devices; and
  each of the plurality of equipment devices
    receives from the power transmitting device the change information related to a resonance frequency value or a Q value of a resonance circuit of the power receiving unit of each of the plurality of equipment devices, and controls the resonance frequency value or the Q value of the resonance circuit of the power receiving unit according to the received change information.

21. A non-contact charging method for charging each of a plurality of equipment devices each including a power receiving device provided with a power receiving unit by transmitting electric power to each of the plurality of equipment devices from a power transmitting device including a non-contact power transmitting unit to each of the plurality of equipment devices at a power transmitting frequency using magnetic field resonance or electric field resonance, wherein:

a first equipment device of the plurality of equipment devices acquires from each of the plurality of equipment devices charging information that includes identification information for identification of each of the plurality of equipment devices and charging power information indicating charging power related to each of the plurality of equipment devices, obtains change information for making a resonance frequency value of a resonance circuit of the power receiving unit of the power receiving device of an equipment device having maximum charging power from among the plurality of equipment devices equal to a value of the power transmitting frequency and for making a resonance frequency value or a Q value of a resonance circuit of the power receiving unit of the power receiving device of each of other equipment devices other than the equipment device having the maximum charging power equal to a value for achieving a power receiving amount that depends on charging power of each of the other equipment devices, causes the communication unit to transmit to each of the plurality of equipment devices the obtained change information corresponding to each of the plurality of equipment devices the second equipment device, and causes the communication unit to transmit to the power transmitting device charging power information related to each of the plurality of equipment devices and efficiency information indicating power charging efficiency between the power transmitting device and each of the plurality of equipment devices, or to transmit to the power transmitting device information indicating electric power which is to be transmitted by the power transmitting unit and obtained using the charging power information and the efficiency information;

a second equipment device of the plurality of equipment devices that is different from the first equipment device receives from the first equipment device the change information related to a resonance frequency value or a Q value of a resonance circuit of the power receiving unit of the power receiving device of the second equipment device; and each of the first and second equipment devices controls a resonance frequency value or a Q value of the resonance circuit of the power receiving unit of the power receiving device of each of the first and second equipment devices according to the change information related to each of the first and second equipment devices.

22. A non-contact charging method for charging each of a plurality of equipment devices each including a power receiving device provided with a power receiving unit by transmitting electric power from a power transmitting device including a non-contact power transmitting unit to each of the plurality of equipment devices at a power transmitting frequency using magnetic field resonance or electric field resonance, wherein:

each of the plurality of equipment devices transmits to an external device charging information that includes identification information for identification of each of the plurality of equipment devices and charging power information indicating charging power related to each of the plurality of equipment devices;

the external device obtains change information for making a resonance frequency value of a resonance circuit of the power receiving unit of the power receiving device of an equipment device having maximum charging power from among the plurality of equipment devices equal to a value of the power transmitting frequency, and for making a resonance frequency value or a Q value of a resonance circuit of the power receiving unit of the power receiving device of each of other equipment devices other than the equipment device having the maximum charging power equal to a value for achieving a power receiving amount that depends on charging power of each of the other equipment devices, causes a communication unit to transmit to each of the plurality of equipment devices the obtained change information corresponding to each of the plurality of equipment devices, and causes the communication unit to transmit to the power transmitting device the charging power information related to each of the plurality of equipment devices and efficiency information indicating power charging efficiency between the power transmitting device and each of the plurality of equipment devices, or to transmit to the power transmitting device information indicating electric power which is to be transmitted by the power transmitting unit and obtained using the charging power information and the efficiency information; and each of the plurality of equipment devices receives from the external device the change information related to a resonance frequency value or a Q value of a resonance circuit of the power receiving unit of the power receiving device of each of the plurality of equipment devices, and controls a resonance frequency value or a Q value of the resonance circuit of the power receiving unit of the power receiving device of each of the plurality of equipment devices according to the received change information.

\* \* \* \* \*